(12) United States Patent
Tsuji

(10) Patent No.: US 10,097,658 B2
(45) Date of Patent: Oct. 9, 2018

(54) TRAFFIC CONTROL OF PACKET TRANSFER

(71) Applicant: NEC CORPORATION, Tokyo (JP)

(72) Inventor: Akira Tsuji, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 135 days.

(21) Appl. No.: 15/105,109

(22) PCT Filed: Nov. 18, 2014

(86) PCT No.: PCT/JP2014/005785
§ 371 (c)(1),
(2) Date: Jun. 16, 2016

(87) PCT Pub. No.: WO2015/092973
PCT Pub. Date: Jun. 25, 2015

(65) Prior Publication Data
US 2016/0323406 A1 Nov. 3, 2016

(30) Foreign Application Priority Data

Dec. 17, 2013 (JP) ................. 2013-260131

(51) Int. Cl.
*H04L 29/08* (2006.01)
*G06F 13/38* (2006.01)
(Continued)

(52) U.S. Cl.
CPC ...... *H04L 67/2814* (2013.01); *G06F 12/0864* (2013.01); *G06F 13/102* (2013.01);
(Continued)

(58) Field of Classification Search
CPC ..... H04L 45/38; H04L 49/00; H04L 67/2814; H04L 69/22
See application file for complete search history.

(56) References Cited

U.S. PATENT DOCUMENTS

2010/0250807 A1 9/2010 Miyoshi
2013/0124707 A1* 5/2013 Ananthapadmanabha ................. H04L 45/7457
709/223

(Continued)

FOREIGN PATENT DOCUMENTS

JP 2008-257596 A 10/2008
JP 2010-225085 A 10/2010
JP 2012-164209 A 8/2012

OTHER PUBLICATIONS

Mahesh Wagh, Intel Corporation, "PCI-SIG PCIe (Trademark) 3.0/2.1 Protocol Update", 2011, Search on Dec. 13, 2013, Internet <url: http://composter.com.ua/documents/PCIe_Protocol_Updates_2011.pdf>.

(Continued)

*Primary Examiner* — Mewale Ambaye
(74) *Attorney, Agent, or Firm* — Sughrue Mion, PLLC

(57) ABSTRACT

An information processing device according to the present invention includes: a flow information storage unit that stores a correspondence between a flow identifier that is information included in a packet, and a network interface; and a switching unit that transfers the packet to either one of a first type of the network interface that gives suggestion information that a destination computer that is a destination of the packet uses for properly processing the packet to the packet, and a second type of the network interface that does not give the suggestion information to the packet based on the information stored in the flow information unit.

8 Claims, 17 Drawing Sheets

(51) Int. Cl.
*H04L 12/931* (2013.01)
*G06F 15/163* (2006.01)
*H04L 29/06* (2006.01)
*G06F 12/0864* (2016.01)
*G06F 13/10* (2006.01)
*G06F 13/40* (2006.01)
*H04L 12/721* (2013.01)

(52) U.S. Cl.
CPC .......... *G06F 13/38* (2013.01); *G06F 13/4022* (2013.01); *G06F 15/163* (2013.01); *H04L 45/38* (2013.01); *H04L 49/00* (2013.01); *H04L 69/22* (2013.01); *G06F 2212/60* (2013.01)

(56) References Cited

U.S. PATENT DOCUMENTS

2013/0132683 A1    5/2013    Ajanovic et al.
2013/0173834 A1*   7/2013    Glaser ................ G06F 12/0802
                                                                710/308

OTHER PUBLICATIONS

Intel Corporation, "Intel 82599 10 GbE Controller Datasheet, Networking Division", Revision 3.3, Mar. 2016, Internet <url: http://www.intel.co.JP/content/www/JP/ja/ethernet-controllers/82599-10-gbe-Controller-datasheet.html>.
"OpenFlow Switch Specification Version 1.3.1 (Wire Protocol 0x04) Sep. 6, 2012", Internet <url:https://www.opennetworking.org/images/stories/downloads/sdn-resources/onf-specifications/openflow/openflow-spec-v1.3.1.PDF>.
International Search Report of PCT/JP2014/005785 dated Jan. 27, 2015 [PCT/ISA/210].
Written Opinion of PCT/JP2014/005785 dated Jan. 27, 2015 [PCT/ISA/237].

* cited by examiner

Fig.5

71 POLICY TABLE

| Policy ID 710 | Flow ID 711 | Throughput 712 | Average packet size 713 | CPU Utilization 714 | Cache Hit Rate 715 | TPH Setting 716 |
|---|---|---|---|---|---|---|
| 0 | MAC=X1, VLAN ID=Y1 | ≧1Gbps | ≧500Byte | 30%≧ | ≧50% | ON |
| 1 | All | ≧1Gbps | All | ≧90% | 30%≧ | OFF |

Fig.7

91 FLOW TABLE

| Flow ID | Port ID | TPH setting |
|---|---|---|
| MAC=X1,<br>VLAN ID=Y1, | 0 | ON |
| MAC=X2,<br>VLAN ID=Y2, | 1 | OFF |

910 911 912

919 FLOW ENTRY

TRAFFIC CONTROL OF PACKET TRANSFER

CROSS REFERENCE TO RELATED APPLICATIONS

This application is a National Stage of International Application No. PCT/JP2014/005785, filed Nov. 18, 2014, claiming priority based on Japanese Patent Application No. 2013-260131, filed Dec. 17, 2013, the contents of all of which are incorporated herein by reference in their entirety.

TECHNICAL FIELD

The present invention relates to a traffic control technology, and more particularly to a traffic control technology of packet transfer.

BACKGROUND ART

There are various known related arts pertaining to packet transfer. A technology of efficiently processing a packet received from a network is disclosed as one of such related arts.

PTL 1 discloses an example of a cache control device. The cache control device described in PTL 1 includes following configurations.

An area setting means sets a write area on a cache memory. The write area is an area into which a predetermined amount of received data can be written.

On processing performed on part of or entire received data written into the write area, an area deletion means deletes an area into which the received data having been a target of the processing are written.

On processing performed on received data, the area setting means newly sets an area having a capacity equivalent to that of the deleted area in a location for writing subsequently received data. The set area is an area into which the subsequently received data can be written. The subsequently received data is data received after reception of the predetermined amount of the received data.

A received data determination means determines whether or not an amount of data exceeding the writing capacity of the write area is received.

A received data write means writes received data into the write area. Further, the received data write means writes received data, an amount of which exceeds the write capacity of the write area, into a main memory.

A data read means performs prefetching the received data from the main memory.

PTL 1 describes that, by having the configuration described above, the cache control device is able to clear processing delay accompanying memory access and increase processing performance, while maintaining an amount of cache memory usage constant without missing packets.

PTL 1 describes that the reason that the processing delay accompanying memory access is cleared is because memory access processing described below is reduced.

A first memory access processing to be reduced is a process for writing from a network interface card (NIC) into a memory. A second memory access processing to be reduced is a process for loading from a central processing unit (CPU) to the memory. A third memory access processing to be reduced is, when data stored in a cache are driven out accompanying the second memory access processing, a process for writing the data into the memory.

With respect to the aforementioned technology of "prefetching received data from a main memory", technologies disclosed in NPL 1 and NPL 2 will be described below step by step by use of drawings.

FIG. 1 illustrates a general configuration of a computer 107 according to the related arts. Referring to FIG. 1, the computer 107 includes a CPU 200 and a main memory 300. The computer 107 further includes an input/output (I/O) controller 407. The computer 107 further includes Peripheral Component Interconnect (PCI)-Express (registered trademark) devices 650. The computer 107 further includes storage devices 660.

The I/O controller 407 is a controller controlling various interfaces to various I/O devices. The I/O controller 407 includes a PCI-Express root complex 440. Further, the I/O controller 407 includes a Serial Advanced Technology Attachment (SATA) interface 441. The I/O controller 407 further includes other I/O interfaces 442. The I/O controller 407 provides the CPU 200 with an access function to I/O devices connected through these interfaces.

In a relatively old-type computer, for example, a memory controller is built into an I/O controller, and a main memory is connected to the I/O controller. However, it is common in the recent computer 107 that a function of a memory controller (not illustrated) is integrated into the CPU 200.

The PCI-Express root complex 440 is located at the highest layer of an I/O fabric configured with PCI-Express, and is an interface for connecting the CPU 200 and the PCI-Express device 650.

The SATA interface 441 is an interface for connecting a storage device, such as a hard disk drive (HDD) or a solid state drive (SSD).

The other I/O interfaces 442 are, for example, a universal serial bus (USB) interface, a Personal System (PS)/2 interface, a serial port interface, a parallel port interface, or the like. Further, the other I/O interfaces 442 are various interfaces for connecting various peripheral equipments to the computer 107.

The PCI-Express device 650 is a device connected to an I/O fabric configured with PCI-Express, and is referred to as an endpoint in the PCI-Express specification. As an example of such a device, a device for network connection such as a NIC is mentioned. As another example, a device for connecting a storage device such as redundant arrays of independent disks (RAID) is mentioned. As another example, a device with an audio visual (AV) function such as a sound card or a video capture card is mentioned.

The storage device 660 is a storage device in conformance with the ATA standard. As example, an HDD, an SSD, a Blu-ray (registered trademark) drive, or the like is mentioned.

FIG. 2 illustrates a configuration of a computer 108 taking a different form from the computer 107. Referring to FIG. 2, the computer 108 is different from the computer 107 in the point that the PCI-Express root complex 440 is built into the CPU 200 and the PCI-Express device 650 is directly connected to the CPU 200. Furthermore, the computer 108 is different from the computer 107 in the point that the CPUs 200 are directly interconnected.

FIG. 3 illustrates an example of a configuration of the CPU 200. The CPU 200 mainly includes a processing core 220, cache memories 223 (a local cache 222 and a shared cache 224), a cache controller 221, and a memory controller 225. In FIG. 3, illustration of the PCI-Express root complex 440 included in the CPU 200 illustrated in FIG. 2 is omitted.

As illustrated in FIG. 3, it is common that the CPU 200 includes a plurality of the processing cores 220. Each processing core 220 includes the cache controller 221 and the local cache 222.

The processing core 220 executes various instructions.

The cache memory 223 stores data used by the processing core 220.

The local cache 222 is a cache memory that may be exclusively used by each processing core 220.

The shared cache 224 is a cache memory shared between the processing cores 220. The shared cache 224 is generally located at the lowest layer of the cache memory hierarchy, and therefore is also referred to as a last-level cache.

The memory controller 225 controls the main memory 300 illustrated in FIGS. 1 and 2.

The cache controller 221 controls access to the cache memory 223. In a common computer, a cache memory has capacity of about one hundredth of the size of a main memory, and is often capable of storing only part of data, instructions, or the like required for certain processing. Accordingly, in data read from the main memory 300, the cache memory 223 only stores data required by the processing core 220 at the time. Consequently, the cache controller 221 controls replacement of data stored in the cache memory 223, write-back of data to the main memory 300, and the like.

In a computer network (hereinafter referred to as a network) such as Ethernet (registered trademark), when receiving a packet, the computer 107 and the computer 108 operate as follows. First, packet data received by a NIC (PCI-Express device 650) is stored in the main memory 300 included in the computer 107 and the computer 108, such as the main memory 300. Secondly, when the CPU 200 processes the received packet, the packet data are read from the main memory 300.

The cache controller 221 checks whether data of a processing target packet is stored in any of the cache memories 223 before accessing the main memory 300. When the required data is not stored in the cache memories 223 (a cache miss case), the cache controller 221 reads the packet data from the main memory 300 through the memory controller 225.

Next, the cache controller 221 stores the read packet data into one of the cache memories 223. A layer of the cache memory 223 into which the data are stored depends on the specification of the cache controller 221. In a case that the CPU 200 processes a packet, when the packet being a processing target is already stored in the cache memory 223 (a hit case), the CPU 200 is able to process the packet without accessing the main memory 300.

The difference between a hit case and a cache miss case of access to the cache memory 223 is the point in that whether or not access to the main memory 300 is performed. However, the difference in delay between access to the cache memory 223 and access to the main memory 300 in the recent CPU 200 has broadened by a factor of several tens to a hundred. Therefore, it is desirable that data processed by the CPU 200 are stored in the cache memory 223, whenever possible.

Consequently, the CPU 200 has a prefetch function of reading required data from the main memory 300 to the cache memory 223 before the CPU 200 requires the data or a processing target. As the prefetch function, there are hardware prefetch which the CPU 200 automatically performs and software prefetch which an operating system (OS) or an application instruct. By prefetching data from the main memory 300 to the cache memory 223, it is possible to store the data in the cache memory 223 before the CPU requires the data.

Currently, a function of giving a hint to data transmitted from a PCI-Express device is defined in the PCI-Express specification. The hint is information used for properly processing packet data received by the CPU 200. This function is referred to as transaction layer protocol (TLP) processing hints (TPH). This function is incorporated in the specification since PCI-Express 2.1. The specification of the TPH is described in detail in NPL 1.

The TPH is a function of writing a hint (for example, a tag called a steering tag) into a specific field in a header of a TLP packet transferred through a PCI-Express fabric based on a memory address of the transfer destination of the TLP packet and the like. How to handle the steering tag (hint) depends on a device on the reception side of the TLP packet (the CPU 200, the I/O controller 407, or the I/O controller 408).

For example, Intel (registered trademark) Corporation implements a function called Direct Cache Access (DCA) on the CPU 200, the I/O controller 407, or the I/O controller 408. The function is a function for the CPU 200 to perform hardware-prefetching data from a PCI-Express device based on the hint.

A NIC dealing with the DCA adds a steering tag as a hint to a TLP packet, and transmits the TLP packet to the CPU 200, the I/O controller 407, or the I/O controller 408. According to NPL 2 (Section 7.5 in particular), in the case of the DCA, a steering tag stores either (1) or (2) described below: (1) a flag indicating whether the DCA is valid or invalid, and an ID indicating a target cache, and (2) a target core ID based on an Advanced Programmable Interrupt Controller (APIC) ID.

Further, according to NPL 2, in the Intel 82599 10 Gigabit Ethernet (registered trademark) Controller, there are three modes, (1), (2), and (3) described below: (1) mode of writing a hint (steering tag: target core ID based on APIC ID) into a TLP packet of a receive descriptor written back to the main memory 300 (referred to as "PCIe TLP" in NPL 2), (2) mode of writing a hint into a TLP packet to the header buffer of a received Ethernet packet, and (3) mode of writing a hint into the payload of a received Ethernet packet.

The payload part of the TLP packet is temporarily stored in the main memory 300. Subsequently, the CPU 200, the I/O controller 407, or the I/O controller 408 performs hardware-prefetching of the payload part to the cache memory 223 based on the steering tag information. The hardware prefetching provides efficient processing of a packet received from a network.

CITATION LIST

Patent Literature

[PLT 1] Japanese Unexamined Patent Application Publication No. 2012-164209

Non Patent Literature

[NPL 1] Mahesh Wagh, Intel Corporation, "PCI-SIG PCIe (Trademark) 3.0/2.1 Protocol Update", 2011, Search on Dec. 13, 2013, Internet <url: http://www.pcisig.com/developers/main/training_materials/get_DOCUMENT?doc_id=86f9463d9783d8662793b3d69e49a02a6917b324>

[NRL 2] Intel Corporation, "Intel 82599 10 GbE Controller Datasheet, Networking Division", Revision 2.8, June, 2013, Search on Dec. 12, 2013, Internet <url: http://www.intel.co.JP/content/www/JP/ja/ethernet-controllers/82599-10-g be-Controller-datasheet.html>

SUMMARY OF INVENTION

Technical Problem

An analysis described below is derived from the present invention.

However, the technologies described in the aforementioned prior art documents have a problem that a cache hit rate may deteriorate.

The reason is because, in the technologies described in the aforementioned prior art documents, prefetch is performed without considering a traffic state of a network, a load state of a processing device for received packets, and the like. The processing device for received packets is the cache control device in PTL 1 and the aforementioned computer 107, computer 108, or the like.

For example, a case in that a cache hit rate deteriorates is a case in that a speed of a CPU receiving packets from a network is higher than a speed of the CPU performing reception processing of the packets. The case will be described more in detail below.

In FIG. 3, the cache memory 223 is generally divided into small-sized areas referred to as cache lines. Each cache line is assigned with an index number. Data read from the main memory 300 is stored in a cache line with a specific index number. The specific index number is an index number matching a value of a specific field in a memory address of the main memory 300 storing the data.

Such a use of a cache line is used in a cache memory 223 is called a direct mapping method or a set associative method. The cache memory 223 operating in accordance with each of the methods is not capable of storing data read from the main memory 300 into an arbitrary location (cache line) in the cache memory 223.

The use of a cache memory in the cache control device disclosed in PTL 1 is a method used regardless of a memory address of the main memory 300. Therefore, the technology disclosed in PTL 1 cannot be applied to the cache memory 223 of the direct mapping method or the set associative method.

When the cache memory 223 is the direct mapping method or the set associative method, a following operation is performed. When data are performed prefetching from the main memory 300 and a cache line, being a storage destination of the data performed prefetching, is already being used, the data stored in the cache line is written back to the main memory 300.

Further, as described above, NPL 1 and NPL 2 disclose a technology called DCA. When a speed of the CPU 200 receiving packets from a network is higher than a speed of the CPU 200 performing reception processing of packets and a technology such as the DCA is used, a following problem may occur.

For example, before the CPU 200 processes the N-th packet stored in a cache memory, packet data after (N+1)-th is performed prefetching. There is a case in that, by performing prefetching of the packet data after the (N+1)-th, the N-th packet is driven out of the cache. Then, when the CPU 200 accesses the cache memory 223, a cache miss occurs. Consequently, the CPU 200 needs to reread the N-th packet from the main memory 300. Thus, performance deteriorates by access to the main memory 300.

That is, prefetching using the DCA technology causes deterioration of a cache hit rate in the CPU 200, and performance of the computer 107 and the computer 108 deteriorates in the points of throughput and CPU utilization.

Further, a case in that a cache hit rate deteriorates is a case in that a cache hit rate of the CPU 200 is already deteriorated. The case of the deterioration of a cache hit rate will be described more in detail below.

The related arts are not able to select whether to perform prefetching depending on a state such as a traffic pattern, traffic priority, and a cache hit rate of the CPU 200.

In other words, in the related arts, setting whether to write TPH into a TLP packet is performed based on static information such as an address of the main memory 300 which is a transfer destination of a received packet.

Consequently, when a technology such as the DCA is used in a case that a cache hit rate of the CPU 200 is deteriorated, replacement of data stored in the cache memory 223 occurs, and the cache hit rate may be additionally deteriorated.

An object of the present invention is to provide an information processing device and a traffic control method for solving the aforementioned problem, and a program for solving the problem or a computer-readable, non-transitory recording medium recording the program.

Solution to Problem

A first information processing device according to one aspect of the present invention includes: a flow information storage unit that stores a correspondence between a flow identifier that is information included in a packet, and a network interface; and a switching unit that transfers the packet to either one of a first type of the network interface that gives suggestion information that a destination computer that is a destination of the packet uses for properly processing the packet to the packet, and a second type of the network interface that does not give the suggestion information to the packet based on the information stored in the flow information unit.

A traffic control method according one aspect of the present invention includes, by a computer including flow information storage unit that holds a correspondence between a flow identifier that is information included in a packet, and a network interface, includes: transferring the packet to either one of a first type of the network interface that gives suggestion information that a destination computer that is a destination of the packet uses for properly processing the packet to the packet, and a second type of the network interface that does not give the suggestion information to the packet based on the information stored in the flow information unit.

A computer-readable non-transitory recording medium according to the present invention recording a program causing a computer including flow information storage unit that holds a correspondence between a flow identifier that is information included in a packet, and a network interface, to perform a method. The method includes: transferring the packet to either one of a first type of the network interface that gives suggestion information that a destination computer that is a destination of the packet uses for properly processing the packet to the packet, and a second type of the network interface that does not give the suggestion information to the packet based on the information stored in the flow information unit.

An second information processing device according to the present invention includes: a processor; and a storage unit that holds: an instruction executed by the processor for the processor to operate as switching unit; and flow information indicating a correspondence between a flow identifier that is information included in a packet, and a network interface. The switching unit, based on the flow information, transfers the packet to either one of a first type of the network interface that gives suggestion information that a destination computer that is a destination of the packet uses for properly processing the packet to the packet, and a second type of the network interface that does not give the suggestion information to the packet based on the flow information.

Advantageous Effects of Invention

The present invention provides an effect that prevention or reduction of deterioration of a cache hit rate is enabled.

BRIEF DESCRIPTION OF DRAWINGS

FIG. 5 is a diagram illustrating an example of a policy table according to the first exemplary embodiment.

FIG. 7 is a diagram illustrating an example of a flow table according to the first exemplary embodiment.

DESCRIPTION OF EMBODIMENTS

Figure 1:
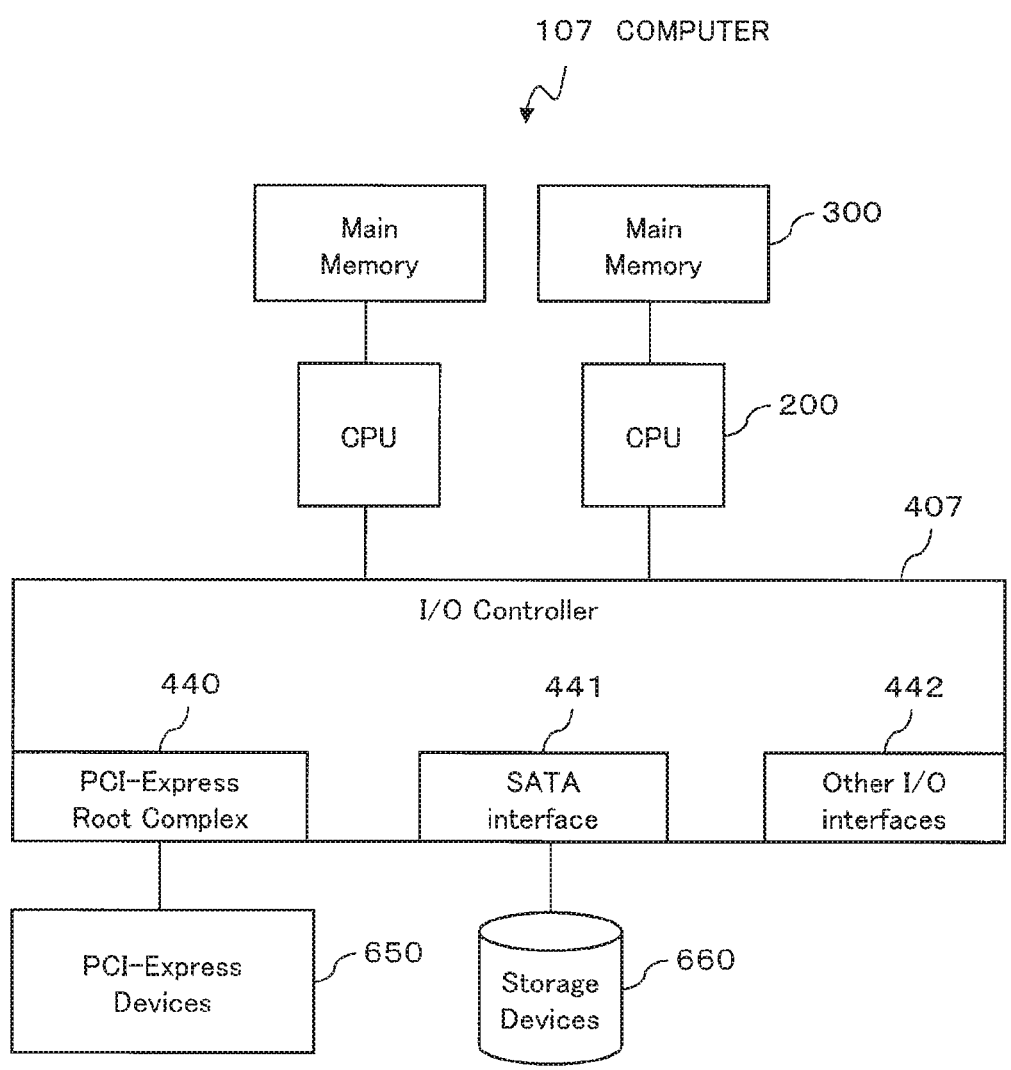
FIG. 1 is a block diagram illustrating a configuration of a computer according to related arts.

Exemplary embodiments of the present invention will be described in detail with reference to the drawings. Reference signs are given to respective components for convenience as examples for better understanding, and do not limit the present invention to the illustrated embodiments. Further, in the respective drawings and the respective exemplary embodiments described in DESCRIPTION, a same reference sign is given to a same component and description thereof is omitted as appropriate.

First Exemplary Embodiment

A first exemplary embodiment of the present invention will be described in detail with reference to the drawing.

[Description of Configuration]

Figure 4:
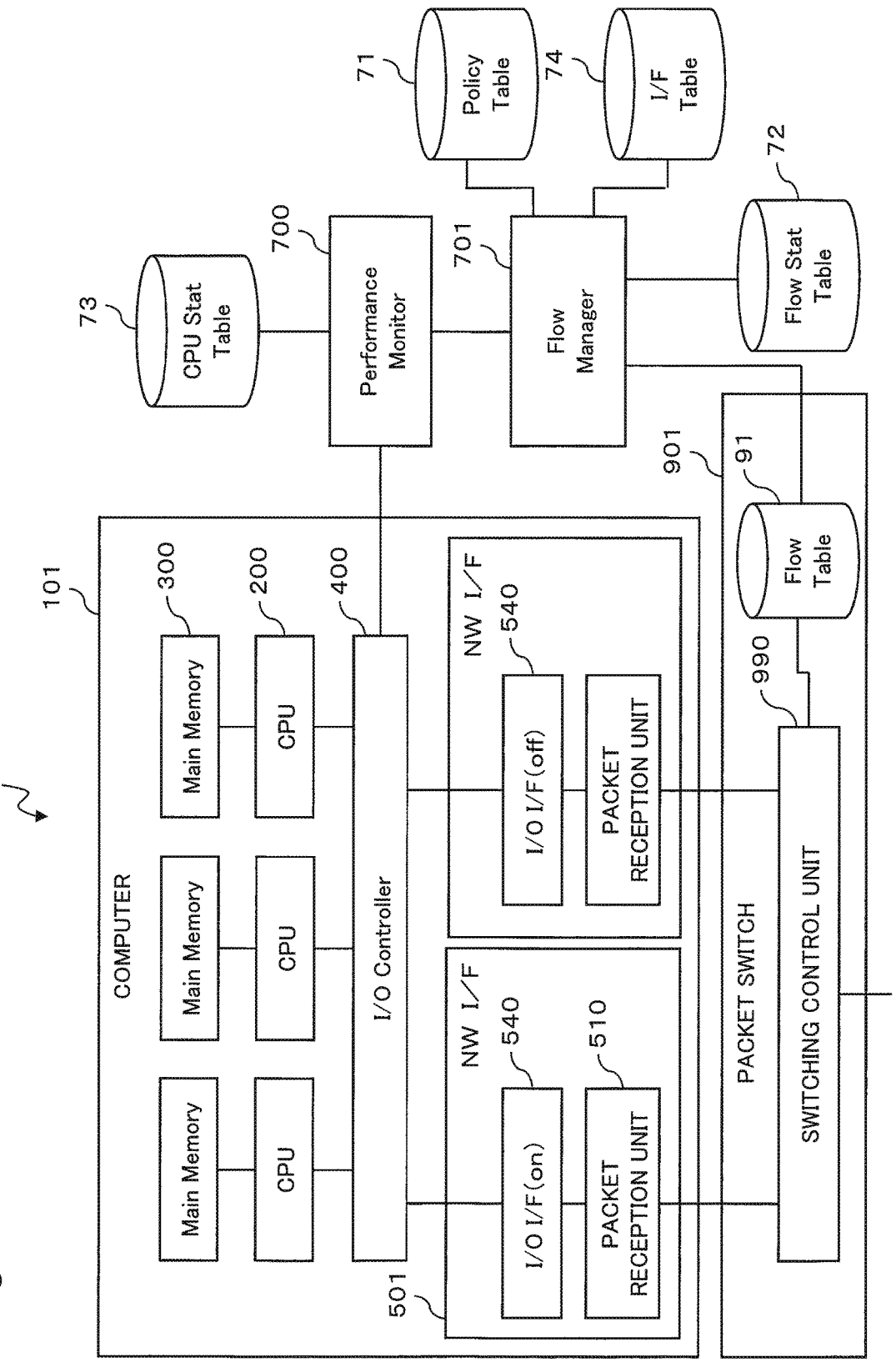
FIG. 4 is a block diagram illustrating a configuration of a traffic control system according to a first exemplary embodiment of the present invention.

FIG. 4 is a block diagram illustrating a configuration of a traffic control system 801 according to the first exemplary embodiment of the present invention.

Referring to FIG. 4, the traffic control system 801 includes a computer 101, a flow manager (also referred to as a flow information update means) 701, and a packet switch 901. The traffic control system 801 further includes a performance monitor 700, a policy table 71, and a flow statistics information table (flow stat table) 72. The traffic control system 801 further includes a CPU statistics information table (CPU stat table) 73 and an interface table (I/F table) 74.

===Computer 101===

The computer 101 includes a CPU 200, a main memory 300, an I/O controller 400, and a network interface (NW I/F) 501.

Figure 2:
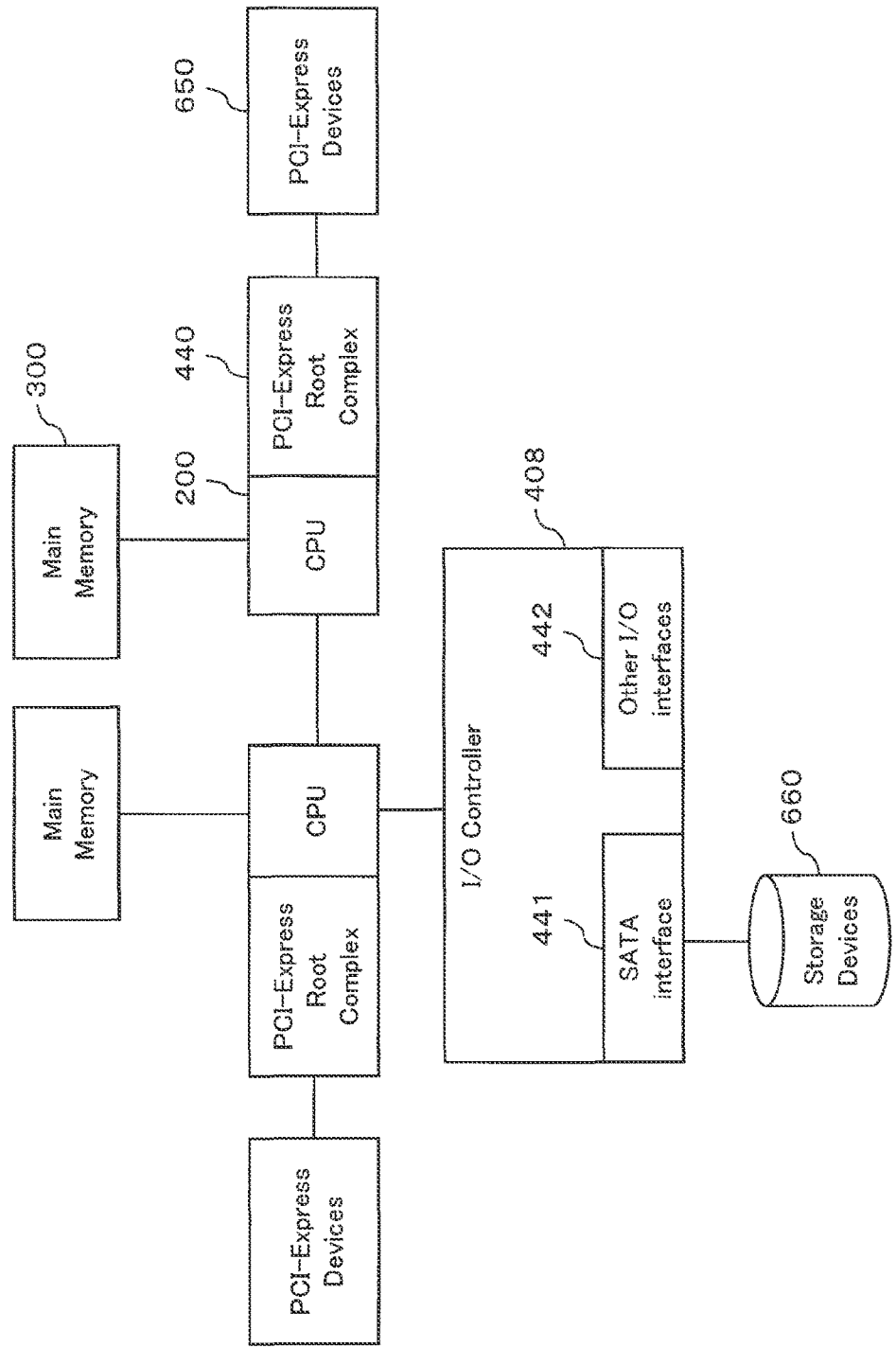
FIG. 2 is a block diagram illustrating a configuration of a computer according to the related arts.
Figure 3:
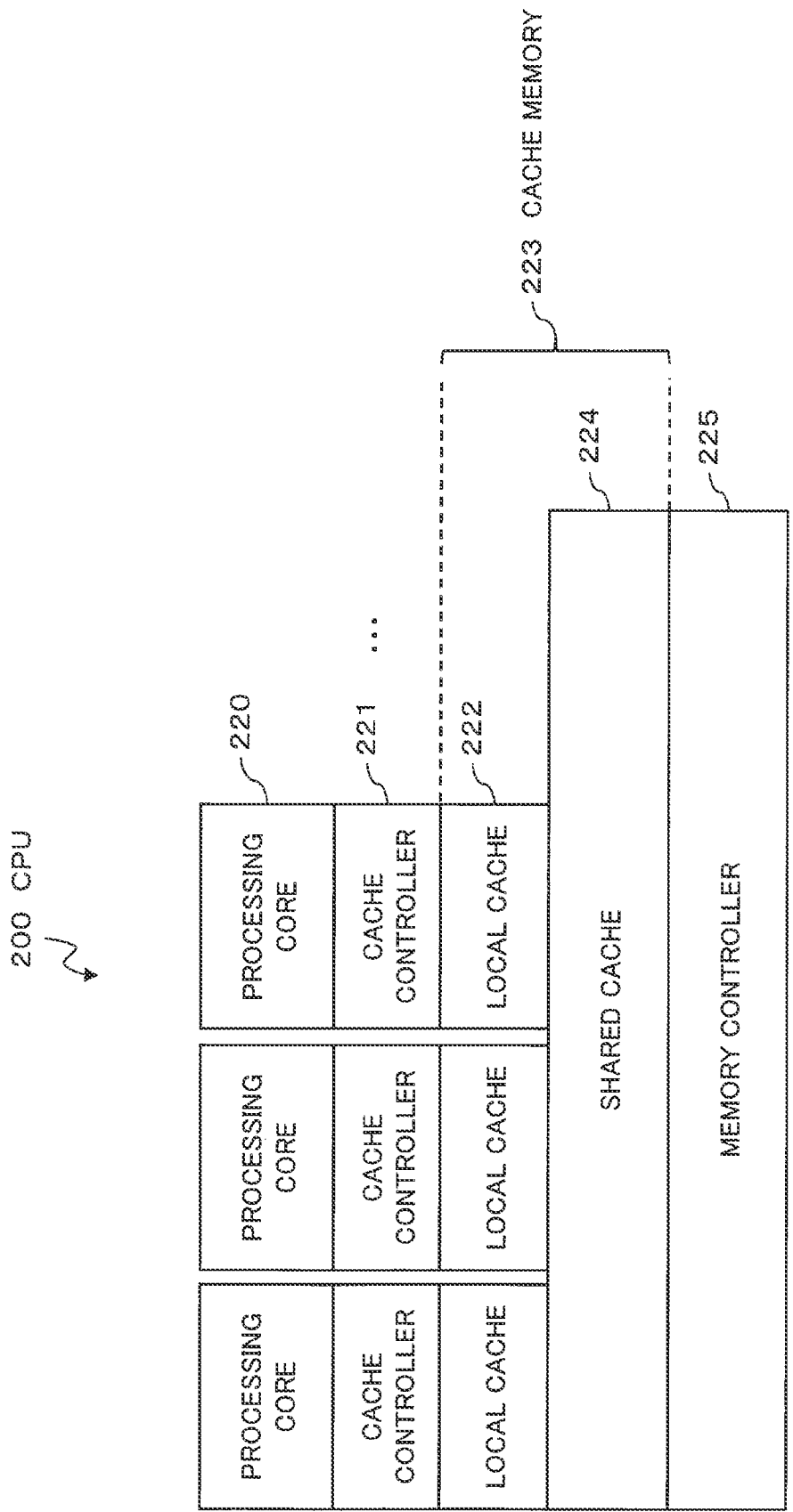
FIG. 3 is a block diagram illustrating an example of a configuration of a CPU according to the related arts.

Further, the computer 101 is configured to implement the NW I/F 501 under the I/O controller 400, similar to the computer 107 in FIG. 1. However, the implementation does not limit the configuration of the computer 101. The computer 101 may be configured to have the NW I/F 501 directly connected to the CPU 200, similar to the computer 108 in FIG. 2. Such a configuration makes no difference to the present exemplary embodiment.

In the present exemplary embodiment, it is assumed that the NW I/F 501 connected to the I/O controller 400 is connected via, for example, PCI-Express. The PCI-Express root complex 440 is not illustrated in the I/O controller 400 in FIG. 4. However, it is assumed that the NW I/F 501 is connected to the PCI-Express root complex 440 (not illustrated) embedded in the I/O controller 400. This configuration does not limit the present exemplary embodiment to a system with PCI-Express.

The NW I/F 501 includes a packet reception unit 510 and an I/O interface (I/O I/F) 540. FIG. 4 illustrates a configuration on the packet reception side of the NW I/F 501 only, and a configuration on the transmission side is omitted.

The packet reception unit 510 is a module performing reception processing of a packet received from a network (not illustrated). In the present exemplary embodiment, it is assumed that the network is Ethernet and an Internet Protocol (IP) packet is transferred. However, the assumption does not limit the present exemplary embodiment to an Ethernet or IP network.

The packet reception unit 510 includes a function included by a reception processing unit in a common network card. As an example of such a function, a received packet check function, a filtering function, or the like is mentioned. The received packet check function is a function of calculating a checksum of a received packet and checking for packet data corruption. The filtering function is a function of filtering a packet based on information of a media access control (MAC) address, a virtual local area network (VLAN) tag, or an IP address included in a packet header.

The I/O I/F 540 is an interface on the NW I/F 501 to the I/O controller 400. The I/O I/F 540 places a received packet in a payload part of a TLP packet and transmits the TLP packet to the I/O controller 400.

In the present exemplary embodiment, the computer 101 includes two or more NW I/Fs 501. At least one I/O I/F 540 among the respective I/O I/Fs 540 included in the respective NW I/Fs 501 gives a hint (also referred to as suggestion information) to the TLP packet. In other words, the TPH is valid in the I/O I/F 540. Further, at least one other I/O I/F 540 does not give the hint to the TLP packet. In other words, the TPH is invalid in the I/O I/F 540.

As illustrated in FIG. 4, the I/O I/F 540 giving the hint (in which TPH is valid) is referred to as an I/O I/F (on) 540. Further, the I/O I/F 540 not giving the hint (in which TPH is invalid) is referred to as an I/O I/F (off) 540.

The hint is, for example, information used for properly processing packet data received by the CPU 200.

Specifically, in the present exemplary embodiment, the hint is information used for the CPU 200 to perform hardware-prefetching of data stored in the main memory 300 by using the DCA function. The data is data in packet (payload) received from the NW I/F 501. The hint includes a flag indicating whether the DCA is valid or invalid, and an ID indicating a target cache.

That is, the CPU 200 performs prefetching of the payload of the TLP packet stored in the main memory 300 to the cache memory 223 based on the hint given to the TLP packet received from the I/O I/F (on) 540.

===Performance Monitor 700===

The performance monitor 700 acquires statistics information of the CPU 200. Next, the performance monitor 700 stores the acquired statistics into the CPU stat table 73. For example, the computer 101 includes a management interface, and the performance monitor 700 acquires the statistics information of the CPU 200 through the management interface. The statistics represent performance information related to performance of the computer 101, and are also referred to as environmental state information related to packets.

As an example of the statistics information of the CPU 200, a cache hit rate or CPU utilization is mentioned. For example, in an Intel CPU, a cache hit rate can be acquired by reading a performance counter value. Further, CPU utilization can be acquired from a resource monitor included in an OS. As an example of a resource monitor, the top command or the mpstat command is mentioned in a case that the OS is Linux (registered trademark).

===CPU Stat Table 73===

The CPU stat table 73 is a table holding CPU 200 statistics acquired by the performance monitor 700. In the computer 101, it is common that a plurality of CPUs 200 or a single CPU 200 includes a plurality of processing cores 220. Thus, the CPU stat table 73 has, for example, an identifier of the processing core 220 or the CPU 200 as a key and a statistic of the processing core 220 or the CPU 200 as a value.

===Flow Manager 701===

The flow manager 701 is connected to the policy table 71, the flow stat table 72, the I/F table 74, a flow table (also referred to as a flow information storage means) 91, and the performance monitor 700. The flow manager 701 acquires network traffic statistics, and stores the statistics into the flow stat table 72. Further, the flow manager 701 updates the flow table 91 based on contents of the policy table 71, contents of the I/F table 74, a flow ID (described later), network traffic statistics, and CPU 200 statistics. The flow ID is also referred to as a flow identifier. The flow manager 701 acquires CPU 200 statistics from, for example, the performance monitor 700.

Network traffic statistics are traffic information of a network in which packets are transferred, and are also referred to as environmental state information.

As an example of network traffic statistics, a traffic amount per unit time, a number of passing packets, a packet arrival interval, or the like, respectively calculated on a per-packet-group unit, is mentioned. The packet group unit is a unit of a packet group identified by a set of an IP address and a port number of Transmission Control Protocol (TCP) or User Datagram Protocol (UDP), or the like.

The flow manager 701 acquires the statistics values from, for example, the packet switch 901. Further, software capable of managing traffic on a per-flow basis may be operated on the computer 101. In this case, the flow manager 701 may acquire the statistics values from the software. As an example of such software, a software called OpenvSwitch is mentioned.

The "flow" represents each packet group identified by a specific value (flow ID) such as an IP address in traffic. A granularity of the flow is various. For example, it is conceivable to define packet groups identified at various granularities as flows by using a set of a MAC address and a VLAN ID, or the like, other than by using the aforementioned set of an IP address and a port number. For example, in the OpenFlow 1.0 specification, a flow can be identified based on a maximum of 12 pieces of information by combining information included in a packet header and information about an input port to a switch.

The flow manager 701 can take a form of a program operating on the computer 101, or can be achieved as a device different from the computer 101.

===Policy Table 71===

FIG. 5 is a diagram illustrating an example of the policy table 71 according to the present exemplary embodiment.

The policy table 71 is a table holding a policy indicating which flow is given the hint in what state.

The policy can be considered as, for example, (1) to (4) described below which uses statistics acquired by the performance monitor 700. (1) A hint is given to a packet belonging to a flow in which an average packet size at a certain time exceeds N bytes (where N is a positive integer). (2) A hint is not given to any packet when a cache hit rate of the CPU 200 is less than M % (where M is a positive real number equal to or less than 100). (3) When a cache hit rate of the CPU 200 is less than M %, a hint is not given to a packet belonging to a flow in which an average packet size is N bytes or less. The average packet size can be calculated from a passing number of bytes per unit time and a number of passing packets in the statistics acquired by the flow manager 701.

Both a policy giving a hint to a certain flow and another policy not giving a hint to the flow may be set to the policy table 71. When the flow matches both of the policies at the same time, it is required to determine which policy is applied. For example, one of the policies is "when a cache hit rate of the CPU 200 is less than M %, a hint is not given to any packet". The anther policy is "a hint is given to a packet belonging to a flow in which an average packet size at a certain time exceeds N bytes".

Accordingly, each of policies in the policy table 71 may have a priority between the respective policies. The priority is defined that, for example, a policy closer to the top of the policy table 71 has a higher priority. Alternatively, a value acquired by accessing the policy table 71 may include priority information.

As illustrated in FIG. 5, the policy table 71 includes a policy ID column 710, a flow ID column 711, and a throughput column 712. The policy table 71 further includes an average packet size column 713, a CPU utilization rate (CPU utilization) column 714, and a cache hit rate column 715. The policy table 71 further includes a TPH setting value (TPH setting) column 716.

It is assumed that, in the policy table 71, an entry in an upper row has a higher priority, that is, a smaller value of the policy ID column 710 represents a higher priority. In the policy table 71, for example, the flow ID column 711 to the cache hit rate column 715 are key columns and the TPH setting column 716 is a value column.

A policy identifier is registered (stored) in the policy ID column 710.

In FIG. 5, for example, a policy with a policy ID=0 represents the following. With respect to a flow with the MAC address being X1 and the VLAN ID being Y1, the TLP packet is given the hint when the throughput is equal to or greater than 1 Gbps, the average packet size is equal to or greater than 500 bytes, the CPU utilization rate is equal to or less than 30%, and the cache hit rate is equal to or greater than 50%. "Giving the hint to the TLP packet" is indicated by the value of the TPH setting column 716 being "ON".

Further, a policy with a policy ID=1 represents the following. For all flows, the TLP packet is not given the hint when the throughput is equal to or greater than 1 Gbps, and, without depending on the average packet size, the CPU utilization rate is equal to or greater than 90%, and the cache hit rate is equal to or less than 30%. "Not giving the hint to the TLP packet" is indicated by the value of the TPH setting column 716 being "OFF".

A flow identifier is registered in the flow ID column 711. The flow identifier is, for example, a MAC address, a VLAN ID, an IP address, or the like.

A condition related to network throughput is stored in the throughput column 712. A condition related to an average packet size in a network is stored in the average packet size column 713. A condition related to utilization rate of the CPU 200 is stored in the CPU utilization column 714. A condition related to a cache hit rate of the CPU 200 is stored in the cache hit rate column 715.

The flow manager 701 refers to the policy table 71 as follows. The flow manager 701 searches the policy table 71 to detect a record including a flow ID obtained from a received packet and complying with network traffic statistics and CPU 200 statistics. The network traffic statistics and the CPU 200 statistics are information acquired by the flow manager 701 from the computer 101 or the packet switch 901. Next, the flow manager 701 obtains the value of the TPH setting column 716 in the detected record.

In the policy table 71, only the flow ID column 711 may be a key column and the throughput column 712 to the TPH setting column 716 may be value columns. In other words, the flow manager 701 may refer to the policy table 71 as follows. First, the flow manager 701 searches the policy table 71 by a flow ID hitting a specific value, and acquires a value of arbitrary column from the throughput column 712 to the TPH setting column 716. Next, the flow manager 701 performs comparison processing between the current value and the value of the acquired column, and acquires a value of the TPH setting column 716 included in the policy complying with all the conditions.

===Flow Stat Table 72===

The flow stat table 72 is a table holding flow statistics acquired by the flow manager 701. Accordingly, the flow stat table 72 has a flow ID as a key, and flow statistics (network traffic statistics corresponding to the flow) and a flag which indicates whether the hint is currently given as values.

===I/F Table 74===

The I/F table 74 is a table managing whether the TPH is valid or invalid for each NW I/F 501 in each computer 101.

Figure 6:
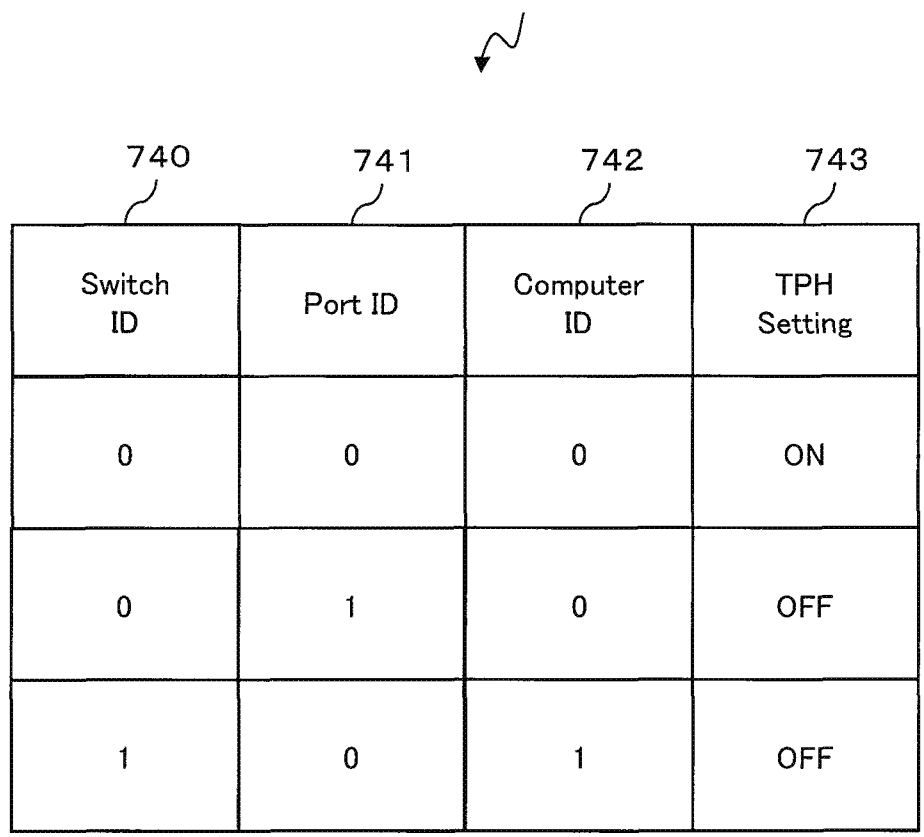
FIG. 6 is a diagram illustrating an example of an interface table according to the first exemplary embodiment.

FIG. 6 is a diagram illustrating an example of the I/F table 74 according to the present exemplary embodiment. The I/F table 74 includes at least a switch ID column 740, a port ID column 741, a computer ID column 742, and a TPH setting value (TPH setting) column 743.

An identifier of the packet switch 901 is stored in the switch ID column 740. An identifier of a port on the packet switch 901 connected to the NW I/F 501 is stored in the port ID column 741. An identifier of the computer 101 including the NW I/F 501 is stored in the computer ID column 742. A value indicating whether the TPH is valid or invalid in the NW I/F 501 is stored in the TPH setting column 743.

When setting a flow entry 919 (described later) to the flow table 91, the flow manager 701 refers to the I/F table 74 in order to obtain information about an output destination of a packet. The information about an output destination of a packet is a value of the port ID column 741, that is, information specifying the NW I/F 501. For example, the value in the I/F table 74 is statically given from outside. Further, the flow manager 701 may obtain the value from each packet switch 901 or each computer 101, or obtain the value by sending a probe packet, and set the obtained value to the I/F table 74.

===Packet Switch 901===

The packet switch 901 includes a switching control unit 990 and the flow table 91.

The switching control unit 990 determines which NW I/F 501 a packet is transferred to, based on information stored in the flow table 91. Next, the switching control unit 990 transmits the packet to the determined NW I/F 501.

FIG. 7 is a diagram illustrating an example of the flow table 91. The flow table 91 is a table holding information related to a transfer destination of each packet.

As illustrated in FIG. 7, the flow table 91 includes the flow entry 919. The flow entry 919 has a flow ID column 910 as a key column, and a port ID column 911 specifying the NW I/F 501 which is the output destination and a TPH setting column 912 of the output destination as value columns. The flow table 91 may further include flow statistics.

A flow ID is stored in the flow ID column 910. A port ID of the packet switch 901 is stored in the port ID column 911. A value indicating whether the TPH is valid or invalid is stored in the TPH setting column 912.

[Description of Operation]

Next, an operation according to the present exemplary embodiment will be described in detail with reference to the drawings.

Figure 8:
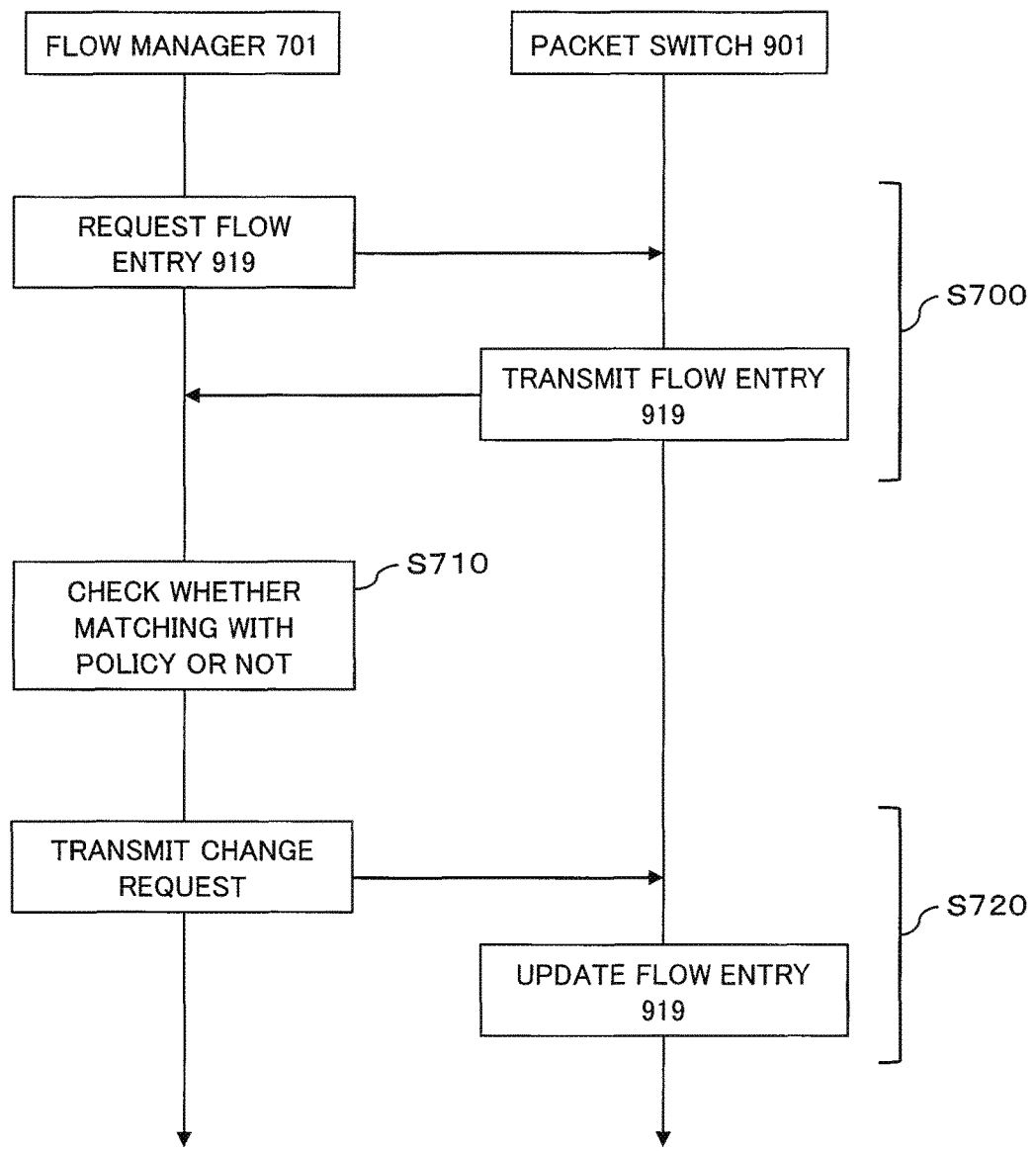
FIG. 8 is a sequence diagram illustrating a flow of processing of changing registered contents with respect to a flow in which a flow entry is registered in the flow table according to the first exemplary embodiment.

FIG. 8 is a sequence diagram illustrating a flow of processing of changing registered contents (contents of the flow entry 919) with respect to a flow of which the flow entry 919 is registered in the flow table 91. For example, the flow manager 701 may start performing processing of changing the registered contents triggered at a predetermined (for example, periodic) timing.

First, the flow manager 701 reads the flow entry 919 in the flow table 91 from the packet switch 901 (Step S700).

Specifically, the flow manager 701 requests read of the flow entry 919 to the packet switch 901. In response to the request, the packet switch 901 transmits the flow entry 919 to the flow manager 701.

Next, with reference to the policy table 71, the flow stat table 72, and the CPU stat table 73, the flow manager 701 checks whether registered contents of the received flow entry 919 matches the policy (Step S710). The flow manager 701 refers to the CPU stat table 73 through the performance monitor 700.

Next, when detecting that the flow entry 919 does not match the policy, the flow manager 701 updates the flow entry 919 (Step S720).

Specifically, the flow manager 701 transmits a change request instructing update of the flow entry 919 to the packet switch 901. The packet switch 901 updates the flow entry 919 based on the received change request.

The change request includes at least a value of the flow ID column 910, and a value of the port ID column 911 and a value of the TPH setting column 912 as values after the update.

The flow manager 701 acquires the value of the port ID column 911 from the I/F table 74. For example, the flow manager 701 acquires the relevant entry from the I/F table 74 based on the identifier of the packet switch 901. Here, the packet switch 901 is the packet switch 901 from which the flow manager 701 reads the flow entry 919 in Step S700.

Next, the flow manager 701 detects an entry in the I/F table 74 including a value of the TPH setting column 743 matching the value of the TPH setting column 716 included in the policy. Here, the policy is the policy which the flow entry 919 not matching is detected in Step S720. Subsequently, the flow manager 701 acquires the value of the port ID column 741 of the detected entry. In other words, the value of the port ID column 741 is information specifying the NW I/F 501 of the output destination of the packet.

Further, the flow manager 701 acquires the value of the TPH setting column 716 included in the policy as the value of the TPH setting column 912.

Figure 9:
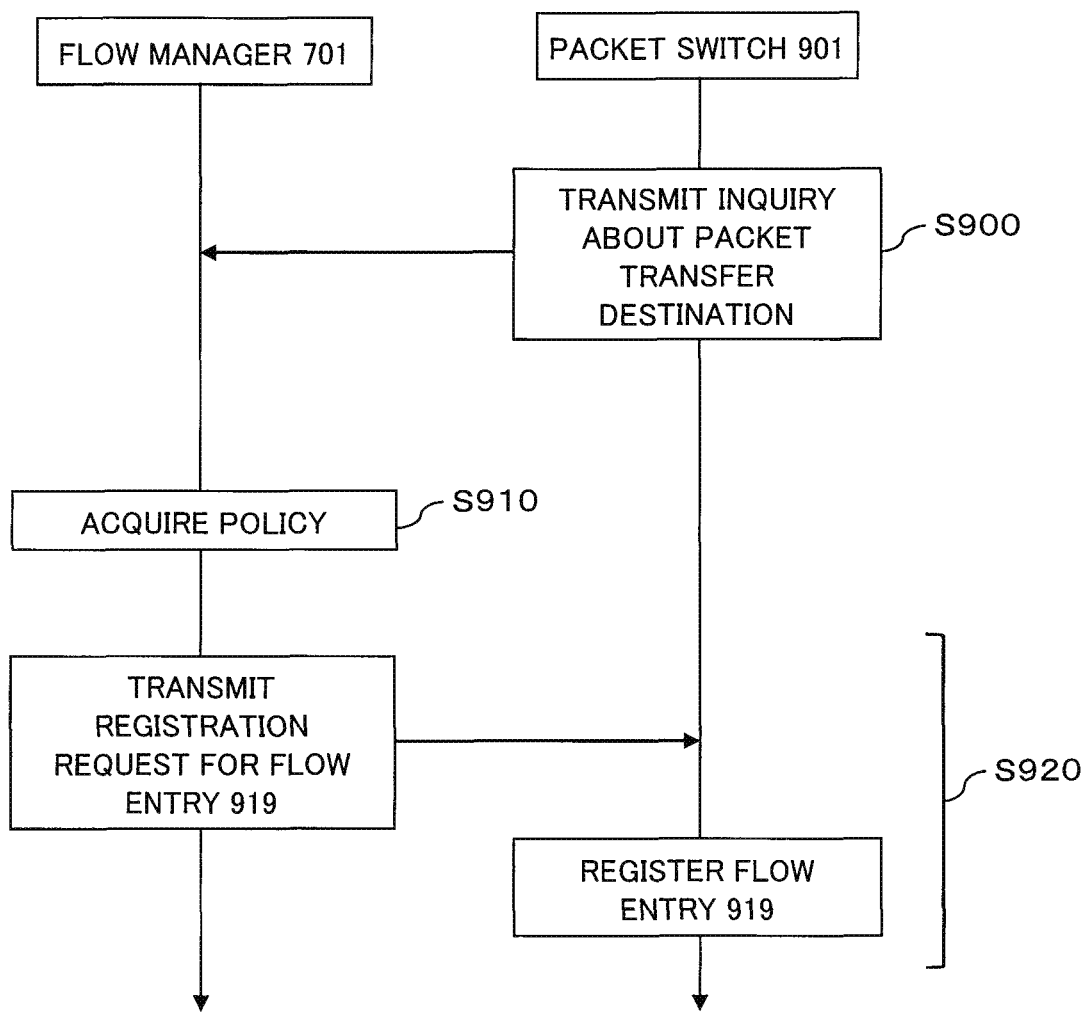
FIG. 9 is a sequence diagram illustrating a flow of processing of registering a new flow entry with respect to a flow in which a flow entry is present in the flow table according to the first exemplary embodiment.

FIG. 9 is a sequence diagram illustrating a flow of processing of newly registering the flow entry 919 to the flow table 91 with respect to a flow not having the flow entry 919 registered in the flow table 91. For example, when detecting that a flow entry corresponding to a received packet is not registered in the flow table 91, the packet switch 901 starts performing processing of newly registering the flow entry 919 to the flow table 91.

First, the packet switch 901 transmits an inquiry about the transfer destination of the packet to the flow manager 701 (Step S900). The packet is a packet belonging to the flow not having the flow entry 919 registered in the flow table 91. The inquiry includes at least a flow ID.

Next, to the inquiry from the packet switch 901, the flow manager 701 acquires an entry from the policy table 71 based on the flow ID and information included in the CPU stat table 73 (Step S910). When referring to the policy table 71, flow statistics are required. However, in case of a new flow, there are no statistics of the flow. Consequently, the flow manager 701 refers to the policy table 71 by using, for example, a predetermined initial value as the flow statistics.

Next, the flow manager 701 adds the flow entry 919 corresponding to the packet inquired from the packet switch 901 to the flow table 91 (Step S920).

Specifically, the flow manager 701 acquires a value of the port ID column 741 corresponding to the value of the TPH setting column 716 registered in the acquired entry of the policy table 71 from the I/F table 74. Subsequently, the flow manager 701 transmits a registration request for the flow entry 919, which including the acquired value of the port ID column 741, the value of the TPH setting column 716, and information about the flow ID included in the inquiry, to the packet switch 901. The packet switch 901 receiving the registration request registers the flow entry 919 based on the registration request.

The flow manager 701 acquires the value of the port ID column 741 with the procedure below. First, the flow manager 701 acquires an entry including the identifier of the packet switch 901 as the value of the switch ID column 740 from the I/F table 74. Secondly, in the acquired entry, the flow manager 701 acquires a value of the port ID column 741 in the entry including the value of the TPH setting column 743 matching the value of the TPH setting column 716.

Figure 10:
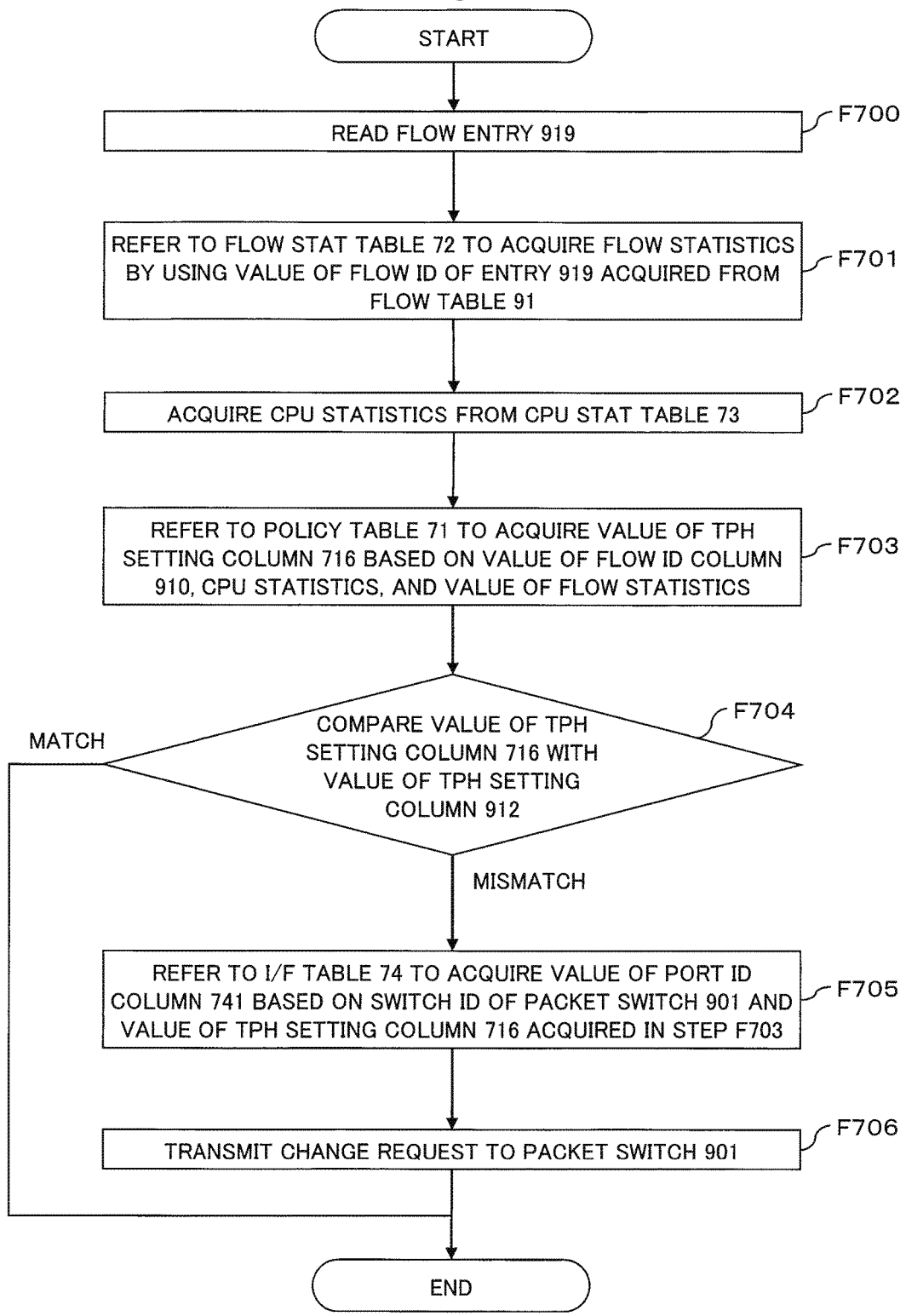
FIG. 10 is a flowchart illustrating an operation of changing registered contents by a flow manager according to the first exemplary embodiment.

FIG. 10 is a flowchart illustrating an operation of the flow manager 701 in the sequence diagram illustrated in FIG. 8. The processing by the flowchart may be performed based on program control by the CPU 200. Further, a processing step name is denoted by a sign such as F700.

First, the flow manager 701 reads the flow entry 919 in the flow table 91 from the packet switch 901 (Step F700).

Next, the flow manager 701 refers to the flow stat table 72 to acquire flow statistics, by using the value of the flow ID column 910 in the flow entry 919 acquired from the flow table 91 (Step F701).

Next, the flow manager 701 acquires the CPU 200 statistics from the CPU stat table 73 through the performance monitor 700 (Step F702).

Next, the flow manager 701 refers to the policy table 71 to acquire the value of the TPH setting column 716 based on the value of the flow ID column 910, the flow statistics, and the CPU 200 statistics (Step F703). Here, the flow statistics is the flow statistics acquired in Step F701. Further, the CPU 200 statistics is the CPU statistics 200 acquired in Step F702.

Next, the flow manager 701 compares the value of the TPH setting column 716 acquired in Step F703 with the value of the TPH setting column 912 included in the flow entry 919 acquired in Step F700 (Step F704).

Next, when the value of TPH setting column 716 matches the value of the TPH setting column 912 ("match" in Step F704), the flow manager 701 completes the processing because it is not necessary to update the flow entry 919.

On the other hand, when the values do not match ("mismatch" in Step F704), the processing proceeds to Step F705.

Next, the flow manager 701 refers to the I/F table 74 to acquire the value of the port ID column 741 based on the switch ID of the packet switch 901 and the value of the TPH setting column 716 acquired in Step F703 (Step F705).

Next, the flow manager 701 transmits the change request to the packet switch 901 (Step F706). The change request is a request for updating the value of the relevant flow entry 919 in the flow table 91 by using the value of the port ID column 911 and the value of the TPH setting column 912 included in the change request as values after the change.

The value of the port ID column 911 and the value of the TPH setting column 912, which are included in the change request as values after the change, respectively are the value of the port ID column 741 acquired in Step F705 and the value of the TPH setting column 716 acquired in Step F703.

As described above, the flow manager 701 changes a flow entry 919 in the flow table 91.

Figure 11:
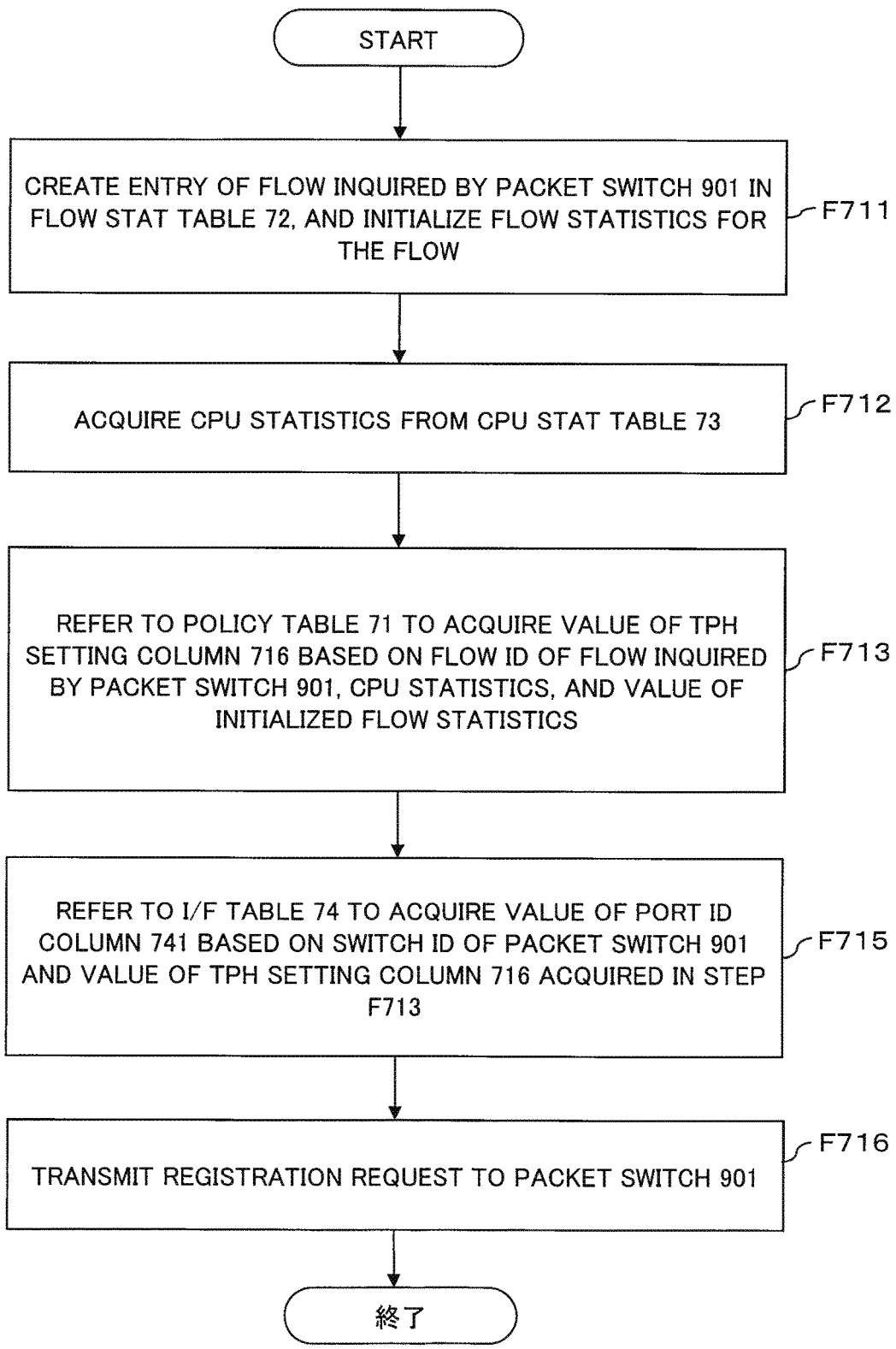
FIG. 11 is a flowchart illustrating an operation of registering a new flow entry by the flow manager according to the first exemplary embodiment.

FIG. 11 is a flowchart illustrating an operation of the flow manager 701 in the sequence diagram illustrated in FIG. 9. The processing by the flowchart may be performed based on program control by the CPU 200. Further, a processing step name is denoted by a sign such as F711.

First, the flow manager 701 creates an entry of the flow inquired by the packet switch 901 in the flow stat table 72, and initializes the flow statistics of the entry (Step F711).

Next, the flow manager 701 acquires the CPU 200 statistics from the CPU stat table 73 through the performance monitor 700 (Step F712).

Next, the flow manager 701 refers to the policy table 71 to acquire the value of the TPH setting column 716 based on the flow ID of the flow, the CPU 200 statistics, and the flow statistics (Step F713). Here, the flow ID is the flow ID of the flow inquired by the packet switch 901. The CPU 200 statistics is the CPU statistics 200 acquired in Step F712. Further, the flow statistics is the flow statistics initialized in Step F712.

Next, the flow manager 701 refers to the I/F table 74 to acquire the value of the port ID column 741 based on the switch ID of the packet switch 901 and the value of the TPH setting column 716 acquired in Step F713 (Step F715).

Next, the flow manager 701 transmits the registration request to the packet switch 901 (Step F716). The registration request is a request for registering the flow entry 919 in the flow table 91. The registration request includes the flow ID of the flow inquired by the packet switch 901, the value of the TPH setting column 716 acquired in Step F713, and the value of the port ID column 741 acquired in Step F715.

As described above, the flow manager 701 adds a new flow entry 919 to the flow table 91.

As a modification of the present exemplary embodiment, the packet switch 901 may generate the flow entry 919 for the new flow (the flow not having a flow entry 919 registered in the flow table 91).

For example, the packet switch 901 generates and registers the flow entry 919 outputting a packet belonging to the new flow to the NW I/F 501 which is a predetermined default packet output destination. In this case, data exchange between the flow manager 701 and the packet switch 901, as illustrated in FIG. 9, does not occur.

A first effect according to the aforementioned present exemplary embodiment is that prevention or reduction of deterioration of a cache hit rate is enabled.

The reason is that a configuration described below is included. In other words, first, the flow table 91 stores a correspondence between the flow ID column 910 and the port ID column 911. Secondly, the switching control unit 990 transfers a packet to either one of the NW I/F 501 which gives the hint to the packet and the NW I/F 501 which does not give the hint based on contents of the flow table 91.

A second effect according to the aforementioned present exemplary embodiment is that more effective prevention or reduction of deterioration of a cache hit rate is enabled in conformity with an environmental state related to packets.

The reason is that the flow manager 701 updates the flow table 91 based on performance information related to the CPU 200 in the computer 101 and the policy table 71 including the performance information in the condition. That is, the switching control unit 990 dynamically determines whether to use the TPH (give the hint) or not based on the updated flow table 91 in accordance with the state of the CPU 200 at the time.

A third effect according to the aforementioned present exemplary embodiment is that yet more effective prevention or reduction of deterioration of a cache hit rate is enabled in more conformity with an environmental state related to packets.

The reason is that the flow manager 701 updates the flow table 91 based on traffic information related to a network in which packets are transferred and the policy table 71 including the traffic information in the condition. That is, the switching control unit 990 dynamically determines whether to use the TPH (give the hint) or not based on the updated flow table 91 in accordance with the state of the traffic at the time.

A fourth effect according to the aforementioned present exemplary embodiment is that, even when a condition for giving the hint is complicated, relatively easy registration of the condition in the policy table 71 is enabled.

The reason is that respective policies included in the policy table 71 have priorities between the policies.

Second Exemplary Embodiment

Next, a second exemplary embodiment of the present invention will be described in detail with reference to the drawing. Description of contents overlapping the aforementioned description is hereinafter omitted in the area which does not make description of the present exemplary embodiment unclear.

Figure 12:
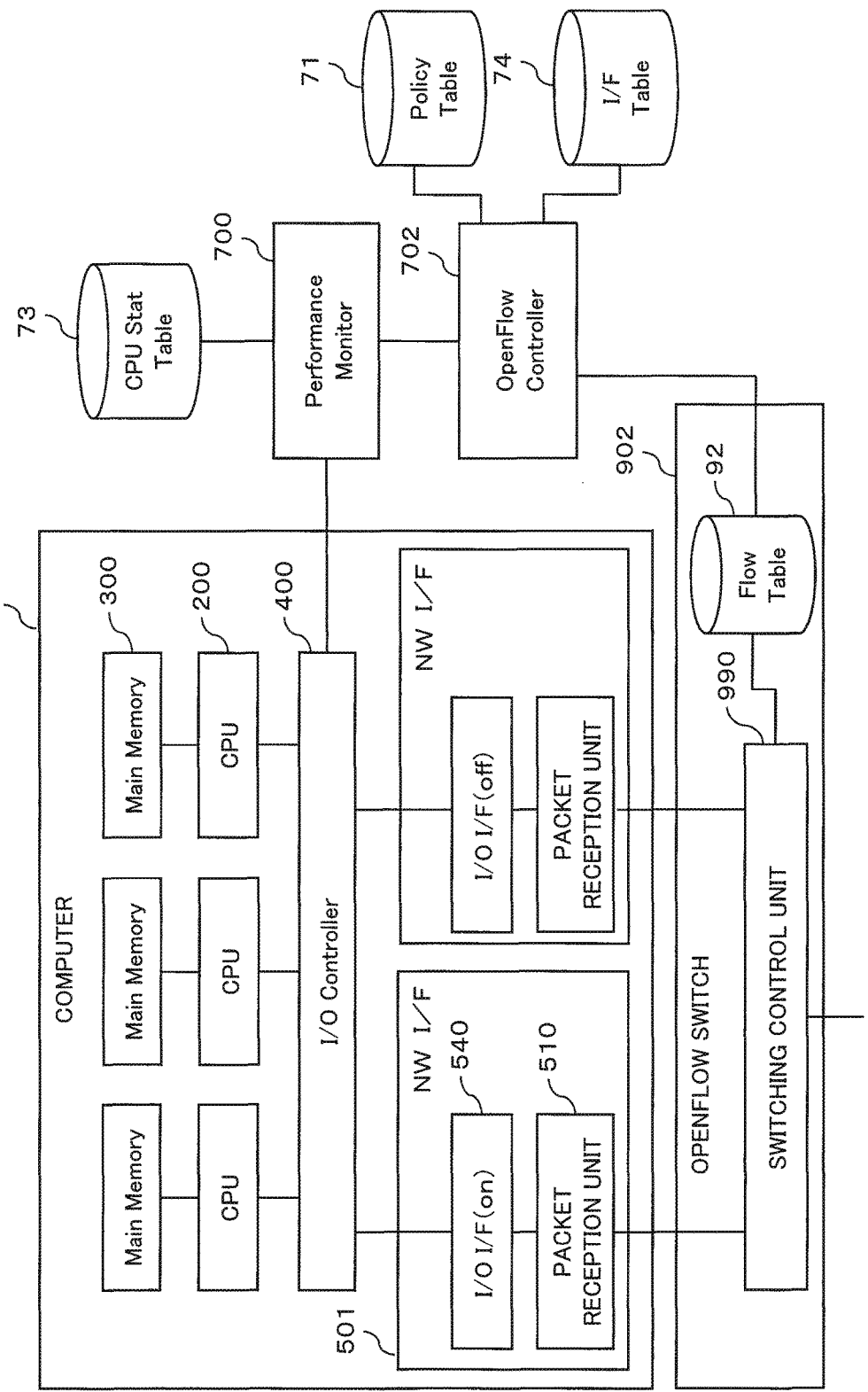
FIG. 12 is a block diagram illustrating a configuration of a traffic control system according to a second exemplary embodiment of the present invention.

FIG. 12 is a block diagram illustrating a configuration of a traffic control system 802 according to the present exemplary embodiment. The traffic control system 802 is a system corresponding with OpenFlow (registered trademark).

OpenFlow is described in detail in documents such as below, and therefore detail description is omitted. "OpenFlow Switch Specification Version 1.3.1 (Wire Protocol 0x04) Sep. 6, 2012", Internet <url:https://www.opennetworking.org/images/stories/downloads/sdn-resou rces/onf-specifications/openflow/openflow-spec-v1.3.1.PDF>.

As illustrated in FIG. 12, the traffic control system 802 includes the computer 101, the performance monitor 700, an OpenFlow controller 702, and an OpenFlow switch 902. The traffic control system 802 further includes the policy table 71, the CPU stat table 73, and the I/F table 74.

The OpenFlow controller 702 controls a switch corresponding with the OpenFlow specification (for example, the OpenFlow switch 902) by using an application programming interface (API) based on the OpenFlow specification.

The OpenFlow controller 702 performs processing equivalent to the processing illustrated in FIGS. 8 to 11 by using the policy table 71 and the I/F table 74. Thus, the OpenFlow controller 702 controls the flow table 91 in the OpenFlow switch 902. At that time, the OpenFlow controller 702 acquires the flow statistics from a flow table 92 in the OpenFlow switch 902 instead of the flow stat table 72.

In the OpenFlow specification, the flow ID, the flow statistics, and processing (action) for a packet belonging to the flow are registered in each flow entry in the flow table 92 included in each OpenFlow switch 902. In other words, a function equivalent to the flow stat table 72 is included in the flow table 92. Thus, the OpenFlow controller 702 is able to have a configuration without the flow stat table 72 from the flow manager 701 illustrated in FIG. 4.

A first effect according to the aforementioned present exemplary embodiment is that the same effects as the first exemplary embodiment can be provided in a system corresponding with OpenFlow.

The reason is that the OpenFlow controller 702 and the OpenFlow switch 902, which respectively have functions equivalent to the flow manager 701 and the packet switch 901, are included in the OpenFlow system.

A second effect according to the aforementioned present exemplary embodiment is that the flow stat table 72 can be eliminated.

The reason is that the flow table 92 in the OpenFlow switch 902 includes a function equivalent to the flow stat table 72.

Third Exemplary Embodiment

Next, a third exemplary embodiment of the present invention will be described in detail with reference to the drawing. Description of contents overlapping the aforementioned description is hereinafter omitted in the area which does not make description of the present exemplary embodiment unclear.

Figure 13:
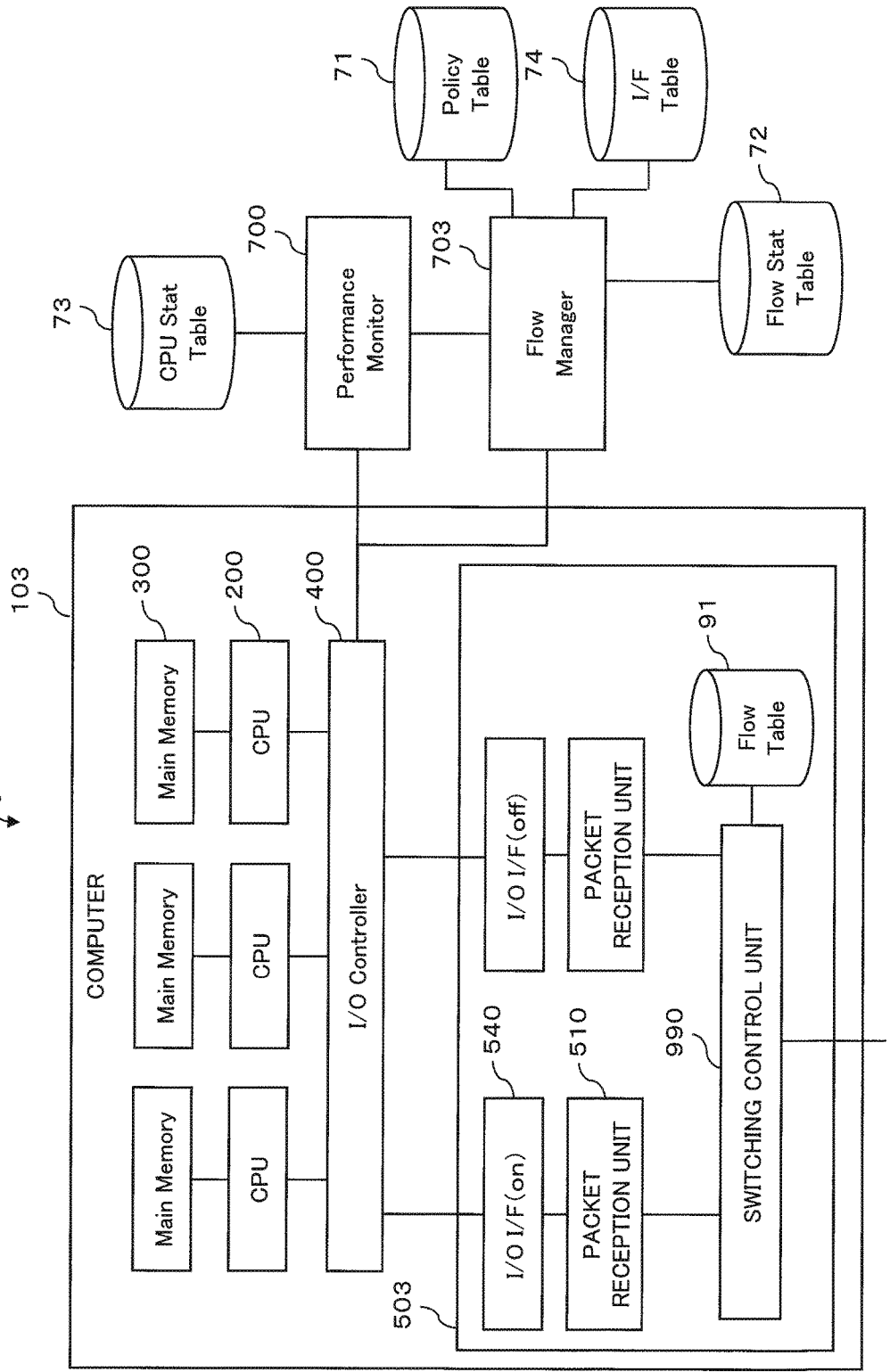
FIG. 13 is a block diagram illustrating a configuration of a traffic control system according to a third exemplary embodiment of the present invention.

FIG. 13 is a diagram illustrating a configuration of a traffic control system 803 according to the third exemplary embodiment of the present invention. The traffic control system 803 is a system using a NW I/F 503 having a packet switch function.

As illustrated in FIG. 13, the traffic control system 803 includes a computer 103, a flow manager 703, the policy table 71, the flow stat table 72, the CPU stat table 73, and the I/F table 74.

The computer 103 is different from the computer 101 illustrated in FIG. 4 in the point that the computer 103 includes the NW I/F 503 instead of the NW I/F 501. Furthermore, the NW I/F 503 is different from the NW I/F 501 illustrated in FIG. 4 in the point that the NW I/F 503 includes a plurality of the I/O I/Fs 540 and the packet reception unit 510, and further the switching control unit 990 and the flow table 91.

The flow manager 703 updates the flow table 91 through, for example, a management interface (not illustrated) of the computer 103.

Effects according to the aforementioned present exemplary embodiment are similar to the effects according to the first exemplary embodiment.

The reason is that the NW I/F 503 includes the switching control unit 990 and the flow table 91, and the flow manager 703 updates the flow table 91 in the NW I/F 503 included in the computer 103.

Fourth Exemplary Embodiment

Next, a fourth exemplary embodiment of the present invention will be described in detail with reference to the drawings. Description of contents overlapping the aforementioned description is hereinafter omitted in the area which does not make description of the present exemplary embodiment unclear.

Figure 14:
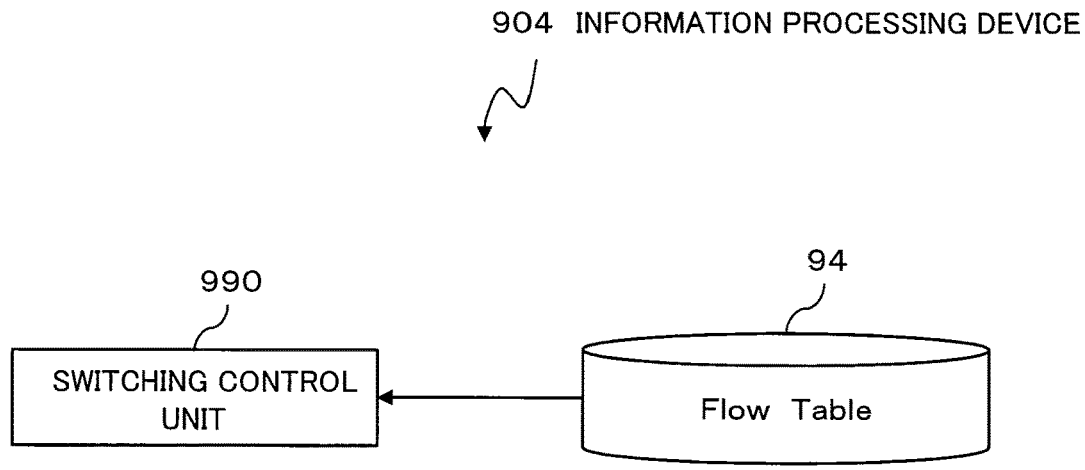
FIG. 14 is a block diagram illustrating a configuration of an information processing device according to a fourth exemplary embodiment of the present invention.

FIG. 14 is a block diagram illustrating a configuration of an information processing device 904 according to the fourth exemplary embodiment of the present invention.

As illustrated in FIG. 14, the information processing device 904 according to the present exemplary embodiment includes a flow table 94 and the switching control unit 990. Each component illustrated in FIG. 14 may be a circuit of a hardware unit or a component which is divided into functional units of a computer device. Components illustrated in FIG. 14 are described herein as components which are divided into functional units of a computer device.

Figure 15:
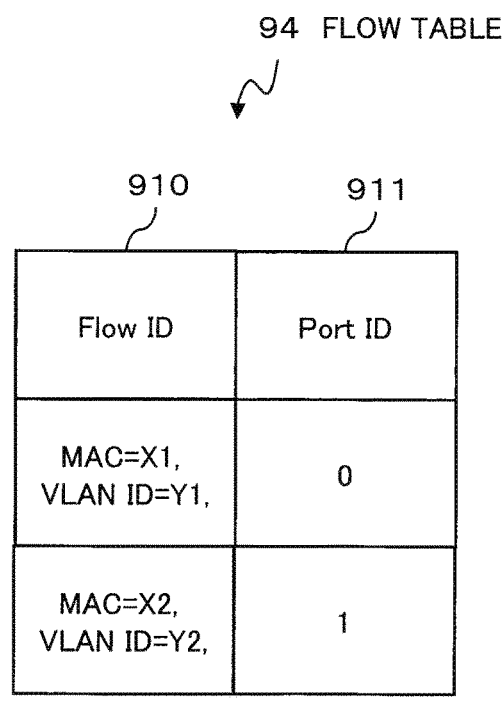
FIG. 15 is a diagram illustrating an example of a flow table according to the fourth exemplary embodiment.

FIG. 15 is a diagram illustrating an example of the flow table 94 according to the present exemplary embodiment.

As described in FIG. 15, the flow table 94 stores a correspondence between the flow ID column 910, which is information included in a packet, and the port ID column 911. The value of the port ID column 911 is the identifier specifying the port (not illustrated) on the switching control unit 990. Consequently, the value of the port ID column 911 specifies a NW I/F (not illustrated) connected to the port on the switching control unit 990. That is, the flow table 94 stores a correspondence between the value of the flow ID column 910 which is information included in a packet and the NW I/F.

The switching control unit 990 transfers a packet to either one of a first type of the NW I/F or a second type of the NW I/F based on information stored in the flow table 94. The first type of the NW I/F gives the hint to the packet. The second type of the NW I/F does not give the hint to the packet. The hint is used by a destination computer for the destination computer, which is a transmission destination of the packet, to properly process the packet.

The above is a description of each component of the information processing device 904 on functional units.

Next, components of the information processing device 904 on hardware units will be described.

Figure 16:
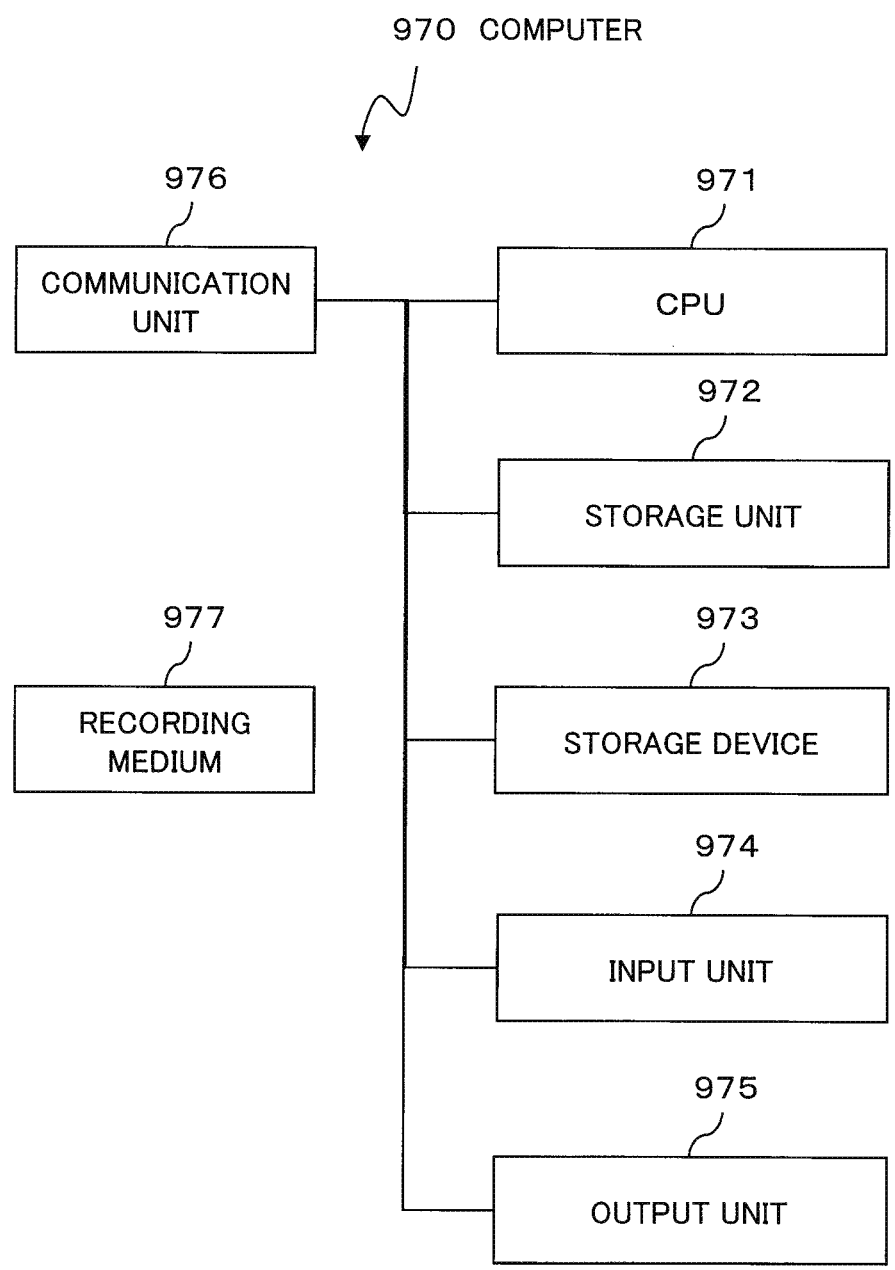
FIG. 16 is a block diagram illustrating a hardware configuration of a computer constituting the information processing device according to the fourth exemplary embodiment.

FIG. 16 is a diagram illustrating a hardware configuration of a computer 970 constituting the information processing device 904 according to the present exemplary embodiment.

As illustrated in FIG. 16, the computer 970 includes a central processing unit (CPU) 971, a storage unit 972, a storage device 973, an input unit 974, an output unit 975, and a communication unit 976. The computer 970 further includes a recording medium (or a storage medium) 977 provided from outside. For example, the recording medium 977 is a non-transitory recording medium (non-temporary recording medium) storing information non-temporarily. Further, the recording medium 977 may be a temporary recording medium holding information as a signal.

The CPU 971 operates an operating system (not illustrated) to control operation of the entire computer 970. For example, the CPU 971 reads a program and data from the recording medium 977 mounted on the storage device 973, and writes the read program and the read data into the storage unit 972. The program is, for example, a program for causing the computer 970 to perform an operation of the flowchart illustrated in FIG. 17 described later.

Then, the CPU 971 performs various types of processing as the information processing device 904 illustrated in FIG. 14 in accordance with the read program or based on the read data.

The CPU 971 may download the program and the data to the storage unit 972 from an external computer (not illustrated) connected to a communication network (not illustrated).

The storage unit 972 stores the program and the data. The storage unit 972 may include the flow table 94.

The storage device 973 is, for example, an optical disk, a flexible disk, a magneto-optical disk, an external hard disk, and a semiconductor memory, and includes the recording medium 977. The storage device 973 (recording medium 977) stores the program in a computer-readable manner. Further, the storage device 973 may store the data. The storage device 973 may include the flow table 94.

The input unit 974 receives input of an operation by an operator and input of information from outside. A device used for the input operation is, for example, a mouse, a keyboard, a built-in key-button, a built-in touch panel, and the like.

The output unit 975 is achieved by, for example, a display. The output unit 975 is used for confirming, for example, an input request through a graphical user interface (GUI), and an output.

The communication unit 976 achieves an interface to the outside (for example, the computer 101, the flow manager 701, or the like, illustrated in FIG. 4). The communication unit 976 is included as a part of the switching control unit 990.

As described above, the blocks of functional units of the information processing device 904 illustrated in FIG. 14 are achieved by the computer 970 of the hardware configuration illustrated in FIG. 16. However, an achievement method of the respective units included in the computer 970 is not limited to the above. In other words, the computer 970 may be achieved with one physically combined device, or achieved with two or more physically separated devices connected with a wired or wireless manner.

When the recording medium 977 recording a code of the aforementioned program is provided to the computer 970, the CPU 971 may read and execute the program code stored in the recording medium 977. Alternatively, the CPU 971 may store the program code stored in the recording medium 977 into the storage unit 972, the storage device 973, or both. In other words, the present exemplary embodiment includes an exemplary embodiment of the recording medium 977, temporarily or non-temporarily storing the program (software) executed by the computer 970 (CPU 971). The storage medium non-temporarily storing information is also referred to as a non-transitory storage medium.

The above are descriptions of respective components of hardware units of the computer 970 constituting the information processing device 904 according to the present exemplary embodiment.

Next, an operation according to the present exemplary embodiment will be described in detail with reference to the drawing.

Figure 17:
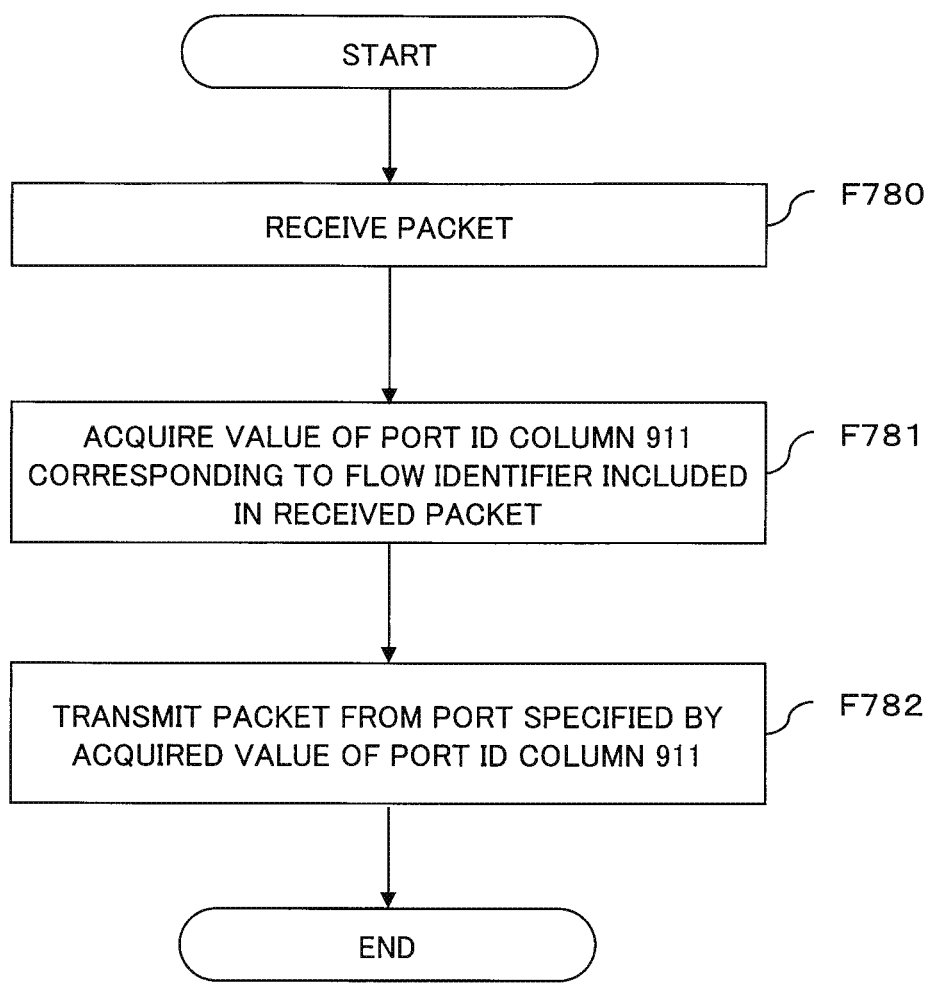
FIG. 17 is a flowchart illustrating an operation according to the fourth exemplary embodiment.

FIG. 17 is a flowchart illustrating an operation according to the present exemplary embodiment. Processing by the flowchart may be performed based on program control by the aforementioned CPU 971. Further, a processing step name is denoted by a sign such as F780.

The switching control unit 990 receives a packet (Step F780).

Next, the switching control unit 990 searches the flow table 94 using a flow ID, included in the received packet, as a key, and acquires a value of the port ID column 911 corresponding to the flow ID (Step F781). That is, the switching control unit 990 determines the NW I/F which is a transfer destination of the packet based on information stored in the flow table 94.

Next, the switching control unit 990 transmits the packet received in Step F780 from the port specified by the acquired value of the port ID column 911 (Step F782).

An effect according to the aforementioned present exemplary embodiment is that prevention or reduction of deterioration of a cache hit rate is enabled.

The reason is that a configuration described below is included. In other words, first, the flow table 94 stores a correspondence between the flow ID column 910 and the port ID column 911. Secondly, the switching control unit 990 transfers a packet to either one of a NW I/F which gives the hint to the packet, or the NW I/F which does not give the hint based on contents of the flow table 94.

Fifth Exemplary Embodiment

Next, a fifth exemplary embodiment of the present invention will be described in detail with reference to the drawings. Description of contents overlapping the aforementioned description is hereinafter omitted in the area which does not make description of the present exemplary embodiment unclear.

Figure 18:
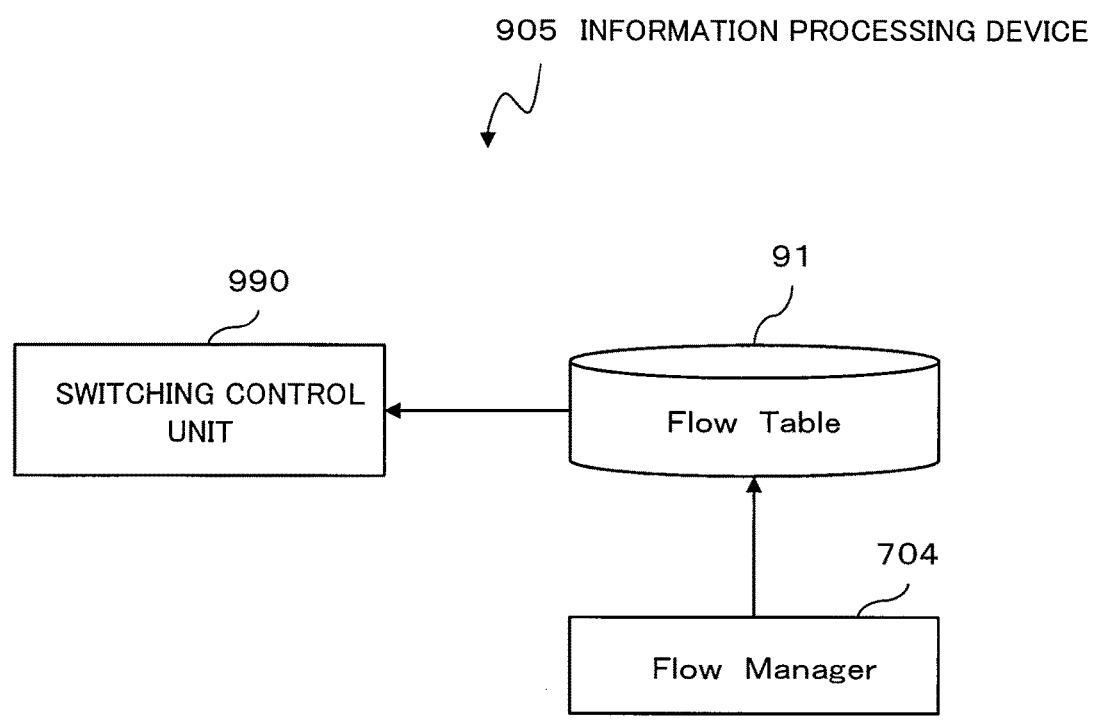
FIG. 18 is a block diagram illustrating a configuration of an information processing device according to a fifth exemplary embodiment of the present invention.

FIG. 18 is a block diagram illustrating a configuration of an information processing device 905 according to the fourth exemplary embodiment of the present invention.

As illustrated in FIG. 18, the information processing device 905 according to the present exemplary embodiment is different from the information processing device 904 illustrated in FIG. 14 in the point that the information processing device 905 further includes a flow manager 704. Further, the information processing device 905 according to the present exemplary embodiment is different from the information processing device 904 illustrated in FIG. 14 in the point that the information processing device 905 includes the flow table 91 illustrated in FIG. 7 instead of the flow table 94. Each component illustrated in FIG. 18 may be a circuit on a hardware units or a component divided into functional unit of a computer device. Components illustrated in FIG. 18 are described herein as components divided into functional units of a computer device.

Based on the flow ID included in a received packet, the environmental state information related to the packet, and the policy, the flow manager 704 determines a correspondence between the flow ID and the NW I/F, and updates contents of the flow table 91.

The environmental state information related to the packet is, for example, performance information related to performance of a computer which is a destination of the packet. The environmental state information related to the packet may be traffic information of a network in which the packet is transferred. Further, the environmental state information related to the packet may be both the performance information and the traffic information.

The policy indicates a correspondence between the flow ID, the environmental state information, and information indicating whether the hint is given or not.

The above is a description of each component of functional unit of the information processing device 905.

Next, components of hardware units of the information processing device 905 will be described. The components of hardware units achieving the information processing device 905 according to the present exemplary embodiment may be the components of the computer 970 illustrated in FIG. 16.

In this case, the program written into the storage unit 972 is, for example, a program for causing the computer 970 to perform an operation equivalent to the operations of the flowcharts illustrated in FIGS. 10 and 11.

Then, the CPU 971 performs various types of processing as the information processing device 905 illustrated in FIG. 18 in accordance with the read program or based on the read data.

The storage unit 972 and the storage device 973 may store the policy as a part of the flow manager 704.

The input unit 974 receives input of an operation by an operator and input of information from outside. A device used for an input operation is, for example, a mouse, a keyboard, a built-in key-button, a built-in touch panel, and the like. The input unit 974 may receive the policy input by an operator as a part of the flow manager 704.

The communication unit 976 may receive the policy and the environmental state information related to the packet from outside as a part of the switching control unit 990.

An operation of the flow manager 704 is equivalent to the operations illustrated in FIGS. 10 and 11.

An effect according to the aforementioned present exemplary embodiment is that, in addition to the effect according to the fourth exemplary embodiment, more effective prevention or reduction of deterioration of a cache hit rate is enabled inconformity with an environmental state related to packets.

The reason is that the flow manager 704 updates the flow table 91 based on the flow ID, the environmental state information, and the policy including the flow ID and the environmental state information.

Each of the components described in the respective aforementioned exemplary embodiments does not need to be an independent component respectively. For example, about each of components, a plurality of components may be achieved as a module. Alternatively, about each of components, a component may be achieved with a plurality of modules. Alternatively, each of components may be a configuration such as that a certain component is a part of another component. Alternatively, each of components may be a configuration such as that a part of certain component overlaps with a part of another component.

Each of the components and each of the modules achieving each of the components according to the respective exemplary embodiments described above may be achieved like hardware as needed if possible. Alternatively, each of the components and each of the modules achieving each of the components may be achieved with a computer and a program. Alternatively, each of the components and each of the modules achieving the respective components may be achieved with mixture of hardware modules, and a computer and a program.

The program is recorded and provided in, for example, a non-transitory computer-readable recording medium such as a magnetic disk or a semiconductor memory, and read by a computer when the computer is booted up or the like. The read program causes the computer to function as the components according to the respective aforementioned exemplary embodiments, by controlling the computer operation.

In the description in each of the exemplary embodiments described above, a plurality of operations are described in a sequential order in a form of a flowchart. However, the order of description does not limit the order of performing the plurality of operations. Therefore, when achieving each of the exemplary embodiment, the order of the plurality of operations may be changed in the area which does not affect the contents.

Furthermore, in each of the exemplary embodiments described above, a plurality of operations are not limited to be performed at mutually different timings. For example, while an operation is performed, another operation may be generated, and a performance timing of an operation may overlap with a performance timing of another operation in part or in whole.

Furthermore, in each of the exemplary embodiments described above, it is described that a certain operation becomes a trigger of other operation. However, the description does not limit all relations between the certain operation and the other operation. Therefore, when achieving each of the exemplary embodiment, the relation between the plurality of operations may be changed in the area which does not affect the contents. Further, a specific description about each operation of each component does not limit the operation of the component. Therefore, each specific operation of each component may be changed in the area which does not affect a function, performance, and other characteristics when performing each of the exemplary embodiment.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SINGS LIST

101 Computer
103 Computer
107 Computer
108 Computer
200 CPU
220 Processing core
221 Cache controller
222 Local cache
223 Cache memory
224 Shared cache
225 Memory controller
300 Main memory
400 I/O controller
407 I/O controller
408 I/O controller
440 PCI-Express root complex
441 SATA interface
442 Other I/O interfaces
501 Network interface (NW I/F)
503 Network interface
510 Packet reception unit
540 I/O interface (I/F)
650 PCI-Express devices
660 Storage devices
700 Performance monitor
701 Flow manager
702 OpenFlow controller
703 Flow manager
704 Flow manager
71 Policy table
710 Policy ID column
711 Flow ID column
712 Throughput column
713 Average packet size column
714 CPU utilization column
715 Cache hit rate column
716 TPH setting column
72 Flow statistics information table (Flow stat table)
73 CPU statistics information table (CPU stat table)
74 Interface table (I/F table)
740 Switch ID column
741 Port ID column
742 Computer ID column
743 TPH setting column
801 Traffic control system
802 Traffic control system
803 Traffic control system
901 Packet switch
902 OpenFlow switch
904 Information processing device
905 Information processing device
990 Switching control unit
91 Flow table
910 Flow ID column
911 Port ID column
912 TPH setting column
919 Flow entry 94 Flow table
970 Computer
971 CPU
972 Storage unit
973 Storage device
974 Input unit
975 Output unit
976 Communication unit
977 Recording medium

The invention claimed is:

1. An information processing system comprising:
a computer comprising:
  a first network interface configured to write suggestion information into a packet, wherein the suggestion information is configured to assist a destination computer in processing the packet, and
  a second network interface configured to not write the suggestion information into the packet;
a flow manager, wherein the flow manager is configured to:
  determine a correspondence between a first flow identifier and the first or second network interface,
  determine environmental state information related to the packet, wherein the environmental state information includes performance of the computer and traffic information related to the packet,
  determine a policy corresponding with the first flow identifier, the environmental state information, and first information indicating whether or not to write the suggestion information,
  determine, based on the first information and the policy, second information indicating whether to transfer the packet to either the first network interface or the second network interface, and
  update contents of a flow information storage device with the second information; and
a packet switch, wherein the packet switch includes:
  the flow information storage device configured to:
    receive, from the flow manager, the second information, and
    store the second information; and
  a switching device configured to transfer the packet to one of the first network interface or the second network interface based on the second information.

2. The information processing system according to claim 1, wherein the flow manager is configured to acquire performance information related to performance of the destination computer, and the environmental state information includes the performance information.

3. The information processing system according to claim 2, wherein the performance information is Central Processing Unit (CPU) utilization and a cache hit rate related to the destination computer.

4. The information processing system according to claim 1, wherein the flow manager is configured to further acquire traffic information of a network in which the packet is transferred, and the environmental state information includes the traffic information.

5. The information processing system according to claim 1, wherein a priority is associated with the policy, the policy is comprised in a plurality of policies maintained by the flow manager.

6. The information processing device according to claim 1, wherein the switching unit and the flow manager are respectively compatible with OpenFlow.

7. A traffic control method by a system, wherein the system includes a computer and a packet switch, wherein the computer includes a flow information storage device wherein the flow information storage device is configured to hold a correspondence between a flow identifier that is information included in a packet, and a network interface, the method comprising:
transferring the packet to one of:
  a first network interface that gives suggestion information that a destination computer that is a destination of the packet uses for properly processing the packet to the packet, and
  a second type of the network interface that does not give the suggestion information to the packet,
wherein the transferring is based on:
  i) a flow identifier of the packet,
  ii) environmental state information related to the packet, wherein the environmental state information includes performance of the computer and traffic information related to the packet, and
  iii) a policy corresponding with the first flow identifier and the environmental state information.

8. A non-transitory computer-readable recording medium recording program instructions for execution by one or more processors of a computer, wherein the computer includes a flow information storage device that holds a correspondence between a flow identifier that is information included in a packet, and includes a network interface, wherein the execution of the program instructions causes the computer to perform steps comprising:
transferring the packet to one of:
  a first network interface that gives suggestion information that a destination computer that is a destination of the packet uses for properly processing the packet to the packet, and
  a second type of the network interface that does not give the suggestion information to the packet,
wherein the transferring is based on:
  i) a flow identifier of the packet,
  ii) environmental state information related to the packet, wherein the environmental state information includes performance of the computer and traffic information related to the packet, and
  iii) a policy corresponding with the first flow identifier and the environmental state information.

* * * * *